United States Patent
Kaku et al.

(10) Patent No.: US 9,544,477 B2
(45) Date of Patent: Jan. 10, 2017

(54) CCTV LENS AND METHOD OF CORRECTING CCTV LENS

(71) Applicant: CBC CO., LTD., Tokyo (JP)

(72) Inventors: Rikki Kaku, Tokyo (JP); Takayuki Tojima, Tokyo (JP)

(73) Assignee: CBC Co., Ltd. (JP)

( * ) Notice: Subject to any disclaimer, the term of this patent is extended or adjusted under 35 U.S.C. 154(b) by 73 days.

(21) Appl. No.: 14/413,464

(22) PCT Filed: Jan. 24, 2013

(86) PCT No.: PCT/JP2013/051382
§ 371 (c)(1),
(2) Date: Jan. 8, 2015

(87) PCT Pub. No.: WO2014/115274
PCT Pub. Date: Jul. 31, 2014

(65) Prior Publication Data
US 2015/0181128 A1   Jun. 25, 2015

(51) Int. Cl.
| H04N 5/225 | (2006.01) |
| G03B 13/34 | (2006.01) |
| G03B 5/02 | (2006.01) |
| G03B 3/10 | (2006.01) |
| G03B 7/10 | (2006.01) |
| H04N 5/232 | (2006.01) |
| G02B 7/10 | (2006.01) |

(52) U.S. Cl.
CPC ............ *H04N 5/2251* (2013.01); *G02B 7/102* (2013.01); *G03B 3/10* (2013.01); *G03B 5/02* (2013.01); *G03B 13/34* (2013.01); *H04N 5/23296* (2013.01); *G03B 2205/0046* (2013.01); *G03B 2205/0053* (2013.01); *H04N 5/23209* (2013.01); *H04N 5/23212* (2013.01)

(58) Field of Classification Search
None
See application file for complete search history.

(56) References Cited

U.S. PATENT DOCUMENTS

| 4,990,948 A | * | 2/1991 | Sasaki | ................... H05K 1/189 361/749 |
| 5,508,781 A | * | 4/1996 | Imai | ........................ G02B 7/08 396/529 |

(Continued)

FOREIGN PATENT DOCUMENTS

| JP | 06273653 A | * | 9/1994 |
| JP | H07-151948 A |   | 6/1995 |

(Continued)

*Primary Examiner* — Justin P Misleh
(74) *Attorney, Agent, or Firm* — Harness, Dickey & Pierce, P.L.C.

(57) ABSTRACT

A substrate of a control unit is composed of a flexible circuit, a microcomputer is provided on the flexible circuit, and a control unit is provided so as to extend along an outer edge of a lens body. Pulse motors are used for zoom adjustment and focus adjustment, and a drive voltage is applied directly from the flexible circuit to an input terminal of each of the pulse motors. The microcomputer of the control unit is connected to an external control device via a serial communication line, and configured to control the respective pulse motors of the CCTV lens on the basis of a command from the external control device.

15 Claims, 16 Drawing Sheets

(56) References Cited

U.S. PATENT DOCUMENTS

| | | | |
|---|---|---|---|
| 5,559,571 A * | 9/1996 | Miyamoto | G03B 5/00 396/52 |
| 6,356,304 B1 | 3/2002 | Kawaguchi et al. | |
| 2007/0297793 A1* | 12/2007 | Noguchi | G03B 17/12 396/529 |
| 2008/0037092 A1* | 2/2008 | Umezu | G02B 5/205 359/227 |
| 2008/0158661 A1* | 7/2008 | Tanaka | G02B 7/102 359/350 |
| 2010/0265365 A1 | 10/2010 | Oshita | |
| 2011/0091198 A1* | 4/2011 | Hasegawa | G03B 9/02 396/505 |

FOREIGN PATENT DOCUMENTS

| | | | |
|---|---|---|---|
| JP | 07283563 A | * | 10/1995 |
| JP | 07294790 A | * | 11/1995 |
| JP | 07294791 A | * | 11/1995 |
| JP | 07294792 A | * | 11/1995 |
| JP | 09-298683 A | | 11/1997 |
| JP | 2000-075190 A | | 3/2000 |
| JP | 2000-165711 A | | 6/2000 |
| JP | 2001-021785 A | | 1/2001 |
| JP | 2004-252139 A | | 9/2004 |
| JP | 2005-202261 A | | 7/2005 |
| JP | 2006-270919 A | | 10/2006 |
| JP | 2007-057897 A | | 3/2007 |
| JP | 2008-083557 A | | 4/2008 |
| JP | 2010-054629 A | | 3/2010 |
| JP | 2010-226157 A | | 10/2010 |

\* cited by examiner

FIG.6A

DATA

BIT SEQUENCE | START | B0 | B1 | B2 | B3 | B4 | B5 | B6 | B7 | STOP

FIG.6B

COMMUNICATION PACKET FORMAT

| STX | COMMAND | MOTOR NUMBER | DATA PORTION | ETX | BCC |
|---|---|---|---|---|---|
| 1 BYTE | 1 BYTE | 1 BYTE | VARIABLE LENGTH BYTE | 1 BYTE | 1 BYTE |

EXTERNAL CONTROL DEVICE ⟶ CONTROL UNIT

| STX | COMMAND | MOTOR NUMBER | ETX | BCC |
|---|---|---|---|---|
| 02h | 53h(S) | 31h | 03h | RESULT OF SUMMING |

FIG.7A

EXTERNAL CONTROL DEVICE ⟵ CONTROL UNIT

| STX | COMMAND | MOTOR NUMBER | DATA PORTION | ETX | BCC |
|---|---|---|---|---|---|
| 02h | 52h(R) | 31h | 3 BYTE OUTPUT BY ASCII FROM 001 TO 999 | 03h | RESULT OF SUMMING |

FIG.7B

CCTV LENS AND METHOD OF CORRECTING CCTV LENS

CROSS-REFERENCE TO RELATED APPLICATIONS

This application is a U.S. National Stage Application of International Application No. PCT/JP2013/051382, filed on Jan. 24, 2013, which is hereby expressly incorporated by reference herein in its entirety.

FIELD OF THE INVENTION

The present invention relates to a CCTV (Closed Circuit Television) lens used for a monitor TV camera, and a method of correcting the CCTV lens such as a peripheral illumination correction of the CCTV lens and a distortion aberration correction of the CCTV lens.

RELATED ART

As a lens for a CCTV camera, a zoom lens or a varifocal lens is employed. The zoom lens is configured not to move a focus (image forming) position even though a zooming (magnification change) operation is performed, and the varifocal lens is different from the zoom lens and is configured to adjust a zoom unit and a focus unit individually. In other words, the varifocal lens is configured to adjust a variable magnification ratio by moving a zoom adjustment lens in the direction of an optical axis, and sets a so-called angle of view. Subsequently, a misalignment of the focus position (so-called out-of-focus) due to the movement of the zoom adjustment lens is corrected by moving a focus adjustment lens. In this manner, the varifocal lens is a lens for correcting the misalignment by the focus unit after the adjustment of the variable magnification ratio by the zoom unit.

JP-A-2001-21785 discloses a varifocal replacement lens configured to perform zoom adjustment and focus adjustment, which has been performed by a manual operation in the related art, by a motor.

SUMMARY OF THE INVENTION

Problems to be Solved by the Invention

However, according to the configuration disclosed in JP-A-2001-21785, in order to control motors for the zoom adjustment and the focus adjustment of the varifocal replacement lens, a lead wire for driving the motors and a signal line of a position detector need to be connected between the motors and a control unit. Therefore, since the lead wires for driving the respective motors, the signal line for the position detector, and the control unit are connected, the number of lines is increased, and the configuration of a circuit becomes complicated.

The control unit configured to drive the motor mounted on the varifocal replacement lens in JP-A-2001-21785 is not provided on the varifocal replacement lens, and hence the lines to the control unit are required for the respective motors. In addition a space for installing the control unit is also required in the vicinity of the varifocal replacement lens. Since the connection between the motor and the control unit is achieved via a connector, a contact failure or the like may also occur with a connector terminal.

Accordingly, it is an object of the invention to simplify lines to respective motors for driving lenses and lens control by assembling a control unit in a varifocal lens and controlling the respective motors of a varifocal replacement lens only with a serial signal line used for supplying power source to the control unit and communication.

Means for Solving the Problems

According to a first aspect of the invention, there is provided a CCTV lens of the invention including: a lens body; a focus adjustment section configured to move a focus lens unit integrated in the lens body by a motor along an optical axis; a zoom adjustment section configured to move a zoom lens unit integrated in the lens body by a motor along an optical axis; an iris adjustment section configured to vary a diaphragm integrated in the interior of the lens body by a motor to increase and decrease an amount of light in the interior of the lens body; and a control unit configured to control the respective motors, wherein a circuit of the control unit is a flexible circuit.

Preferably, the flexible circuit of the control unit is provided with a microcomputer on the circuit.

Preferably, the microcomputer of the control unit is connected to an external control device with a serial communication line, and the respective motor is controlled on the basis of a command from the external control device.

Preferably, the microcomputer stores an identification number of the lens body, checks whether the identification number transmitted from the external control device via the serial communication line matches the identification number stored in the lens body and, when the identification number is matched, the command from the external control device is accepted.

Preferably, the microcomputer is configured to be capable of storing and reading out the number of steps from reference positions of the motors as positional data of the respective lenses of the focus adjustment section and the zoom adjustment section.

Preferably, the microcomputer is configured to store operation history of the respective motors and output the operation history of the respective motors to the external control device via the serial communication line.

Preferably, the microcomputer controls the zoom lens unit and the focus lens unit to move to predetermined positions on the basis of a zoom switching command from the external control device.

Preferably, the microcomputer is configured to control the motor so as to move the zoom lens unit and the focus lens unit to the predetermined positions when a power source is supplied from the outside and the power source is turned ON.

Preferably, the motor is a pulse motor, and is configured to apply a drive voltage to an input terminal of the pulse motor directly from the flexible circuit.

Preferably, the lens body is a varifocal lens, which is a zoom optical system.

According to a second aspect of the invention, there is provided a method of correcting a CCTV lens provided as a lens for a CCTV camera, the CCTV lens including: a lens body; a focus adjustment section configured to move a focus lens unit integrated in the lens body by a pulse motor along an optical axis; a zoom adjustment section configured to move a zoom lens unit integrated in the lens body by a pulse motor along an optical axis; a control unit configured to control the pulse motors, wherein the control unit performs steps of: storing data of a coefficient of a polynomial indicating a relationship for correcting brightness in the periphery of the lens with respect to an image height for every number of steps from a reference position of the pulse motor of the zoom adjustment section as positional data of the zoom lens unit and acquiring image data of the CCTV camera; and acquiring the data of a coefficient of a polynomial corresponding to the image data of the CCTV camera and indicating a relationship of the brightness in the periphery of the lens with respect to the image height in accordance with the number of steps from the reference position of the pulse motor of the zoom adjustment section from the control unit; and correcting the brightness of the image data of the CCTV camera on the basis of the acquired data of a coefficient of a polynomial.

According to a third aspect of the invention, there is provided a method of correcting a CCTV lens provided as a lens for a CCTV camera, the CCTV lens including: a lens body; a focus adjustment section configured to move a focus lens unit integrated in the lens body by a pulse motor along an optical axis; a zoom adjustment section configured to move a zoom lens unit integrated in the lens body by a pulse motor along an optical axis; a control unit configured to control the pulse motors, wherein the control unit performs steps of: storing data of a coefficient of a polynomial indicating a relationship of distortion aberration of the lens with respect to an image height for every number of steps from a reference position of the pulse motor of the zoom adjustment section as positional data of the zoom lens unit and acquiring image data of the CCTV camera; and acquiring the data of a coefficient of a polynomial corresponding to the image data of the CCTV camera and indicating a relationship of the distortion aberration of the lens with respect to the image height in accordance with the number of steps from the reference position of the pulse motor of the zoom adjustment section from the control unit; and correcting the distortion aberration of the image data of the CCTV camera on the basis of the acquired data of a coefficient of a polynomial.

According to a fourth aspect of the invention, there is provided a method of correcting a CCTV lens provided as a lens for a CCTV camera, the CCTV lens including: a lens body; a focus adjustment section configured to move a focus lens unit integrated in the lens body by a pulse motor along an optical axis; a zoom adjustment section configured to move a zoom lens unit integrated in the lens body by a pulse motor along an optical axis; an iris adjustment section configured to adjust a diaphragm in the interior of the lens body by adjusting an F number (Fno) of a lens by a pulse motor increase and decrease an amount of light in the interior of the lens body; and a control unit configured to control the respective pulse motors, wherein the control unit performs steps of: storing data of a resolution of the lens with respect to the F number (Fno) of the lens corresponding to the number of steps from a reference position of the pulse motor of the zoom adjustment section and data of the Fno corresponding to the number of steps from a reference position of the pulse motor of the iris adjustment section as positional data of the zoom lens unit, and selecting data of the F number (Fno) having a highest resolution with respect to the number of steps from the reference position of the pulse motor of the zoom adjustment section; reading out the data of the diaphragm position from the F number having the selected highest resolution; and driving the pulse motor of the iris adjustment section to set the diaphragm (aperture stop) to a desired position.

Effects of the Invention

According to the invention, since the control unit composed of the flexible circuit including the microcomputer having a communication function and a motor drive circuit is provided on the CCTV lens (varifocal lens), the CCTV lens can be controlled easily by inputting the command to the flexible circuit from the power source and the outside via communication.

Also, direct wiring from the flexible circuit to the respective motors for driving the lenses is possible, whereby the number of lines can be restrained, and the motor wiring is simplified. Since the communication with respect to the external control device employs a serial communication system, the number of signal lines with the external control device can be reduced.

In addition, since the position of the lens can be controlled by the microcomputer, setting of an angle of view such as wide angle, middle, and telephoto is achieved easily by varying a focal length to vary a magnification.

In the related art, positional detection of the motor is achieved from values of resistance of a potentiometer. Since these values are analogue values, calculation for the positional detection is achieved by converting these analogue values to digital values. According to the invention, with the employment of the pulse motor as the motor, open-loop control is enabled, and a position detector is not required, so that the portion around the lens body can be reduced in size.

BRIEF DESCRIPTION OF THE DRAWINGS

FIG. 6A is a drawing illustrating a configuration of byte data in communication with the control unit and an external control device. FIG. 6B is a drawing illustrating a configuration of a communication packet format.

FIG. 7A is a drawing illustrating a communication mode for requiring data on the number of steps from a reference position of a pulse motor as a lens position from the external control device to the control unit. FIG. 7B is a drawing illustrating a communication mode of a response from the control unit.

THE MODE FOR CARRYING OUT THE INVENTION

Figure 1:
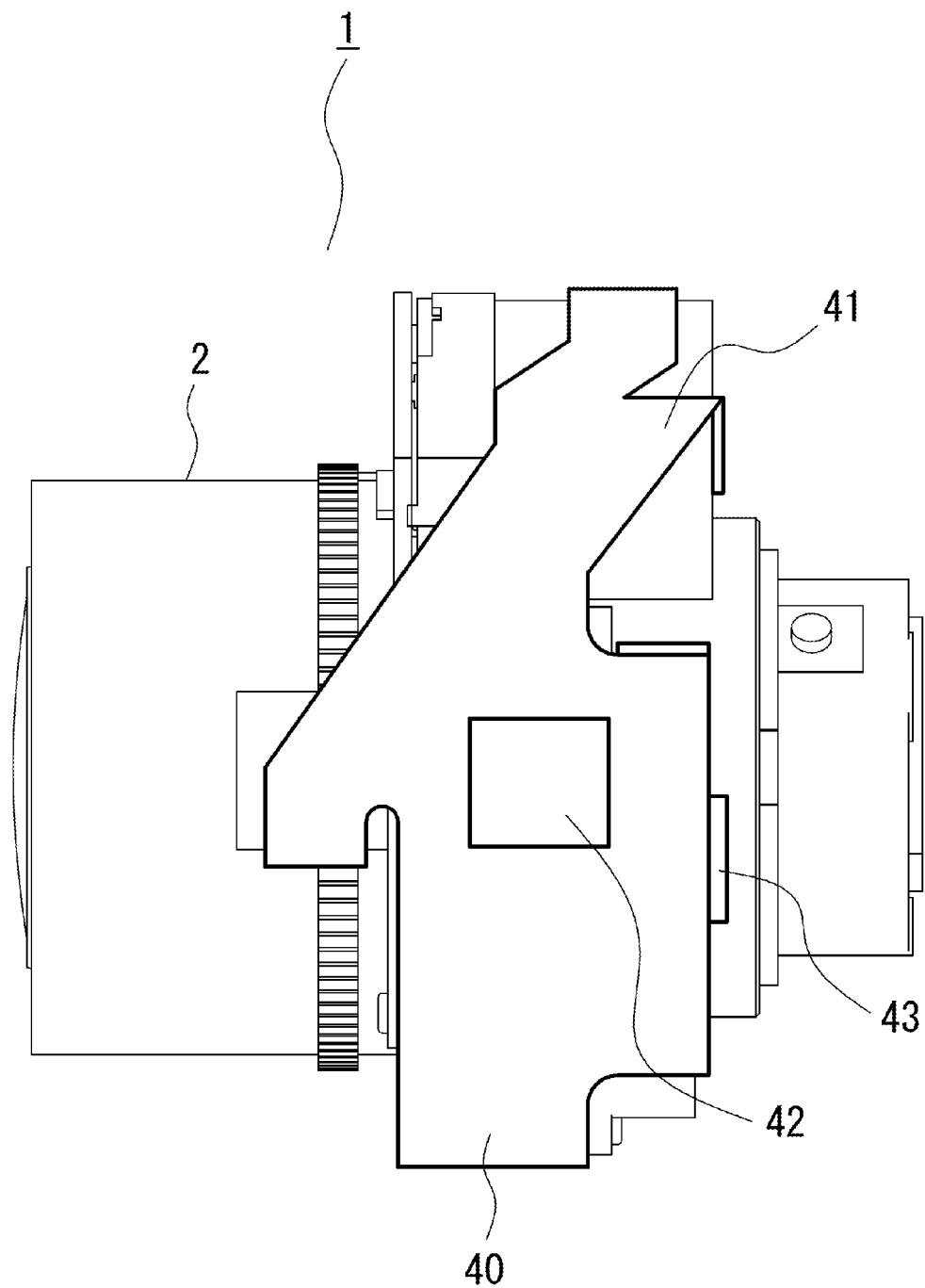
FIG. 1 is a drawing illustrating an appearance of a varifocal lens.

Referring now to the drawings, embodiments of a CCTV lens and a method of correcting a CCTV lens of the invention will be described. The CCTV lens of the invention described here is a varifocal lens having a zoom adjustment section and a focus adjustment section.

Configuration of Varifocal Lens

Figure 2:
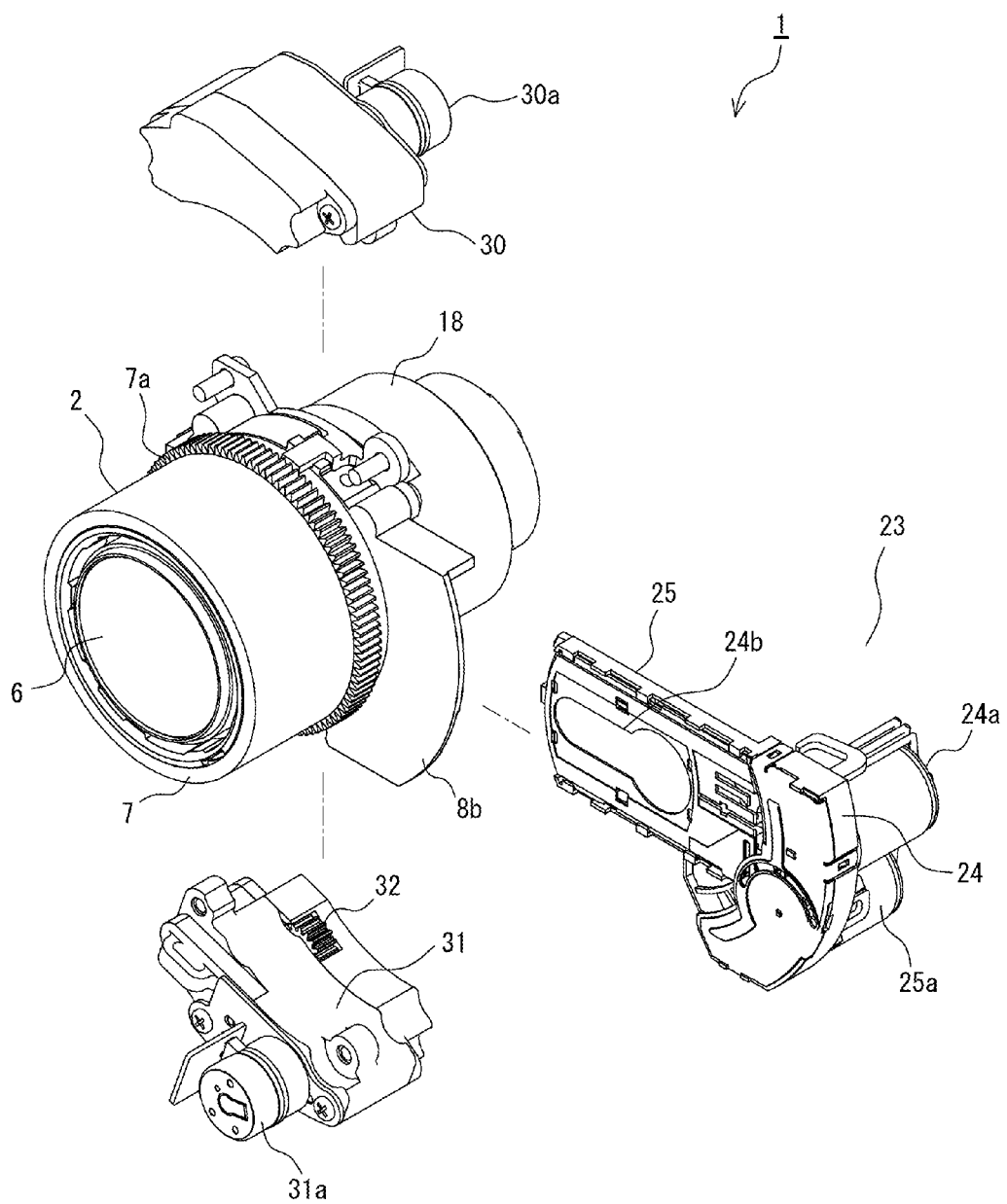
FIG. 2 is an exploded perspective view of a varifocal lens body and respective units.
Figure 3:
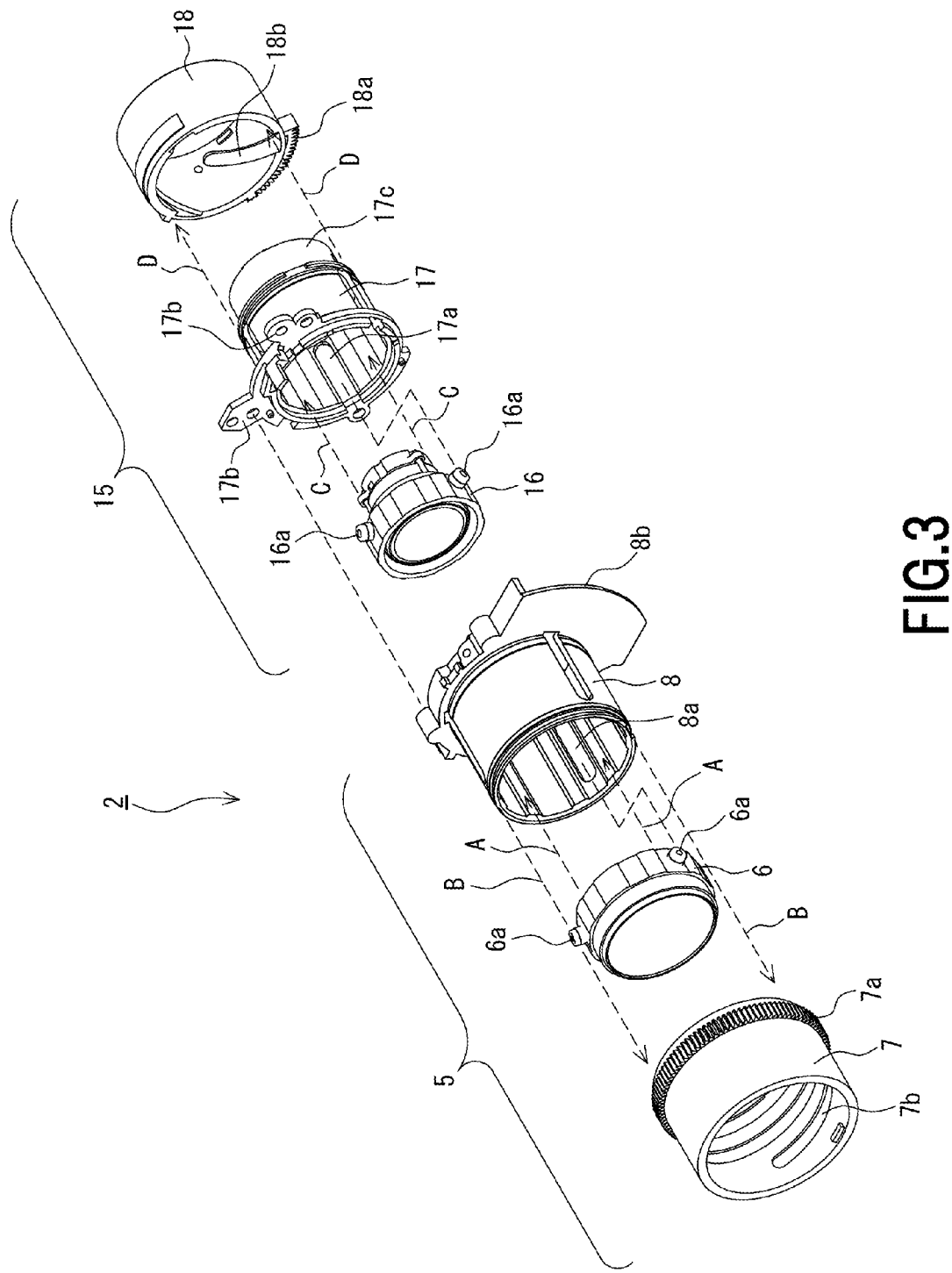
FIG. 3 is an exploded perspective view of the varifocal lens body.
Figure 4:
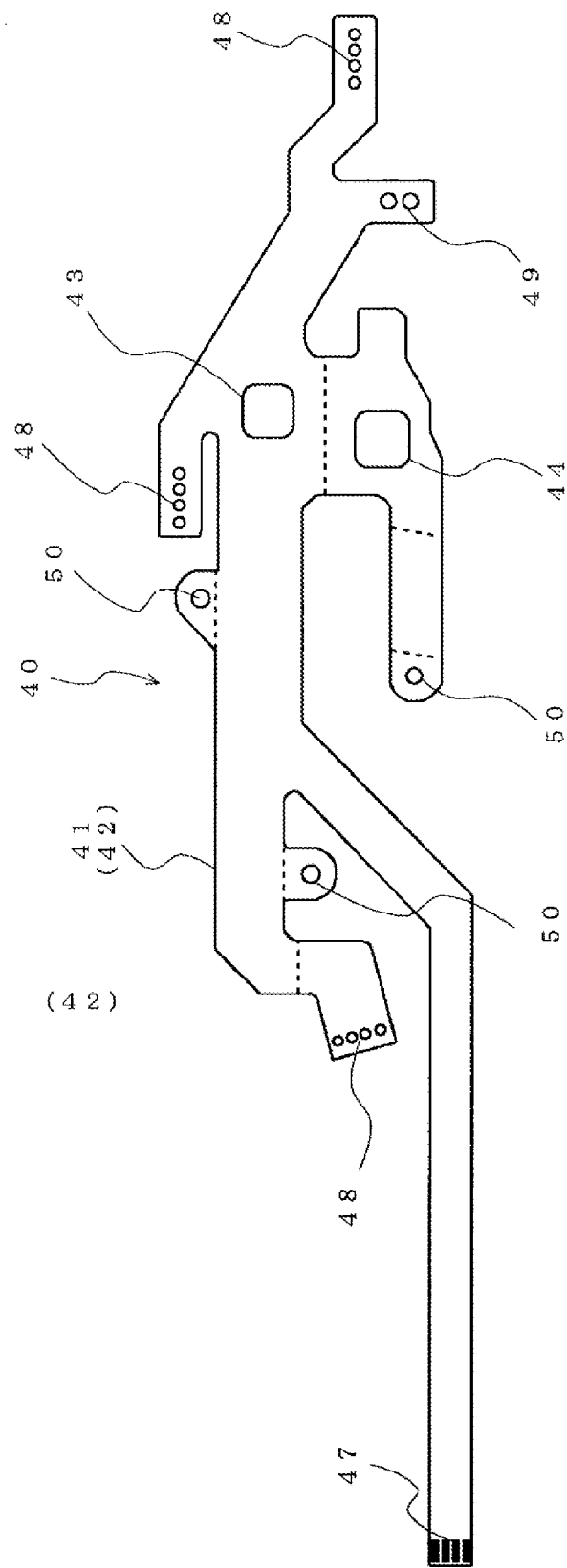
FIG. 4 is a drawing illustrating an appearance of a flexible circuit provided along an outer edge of the varifocal lens.
Figure 5:
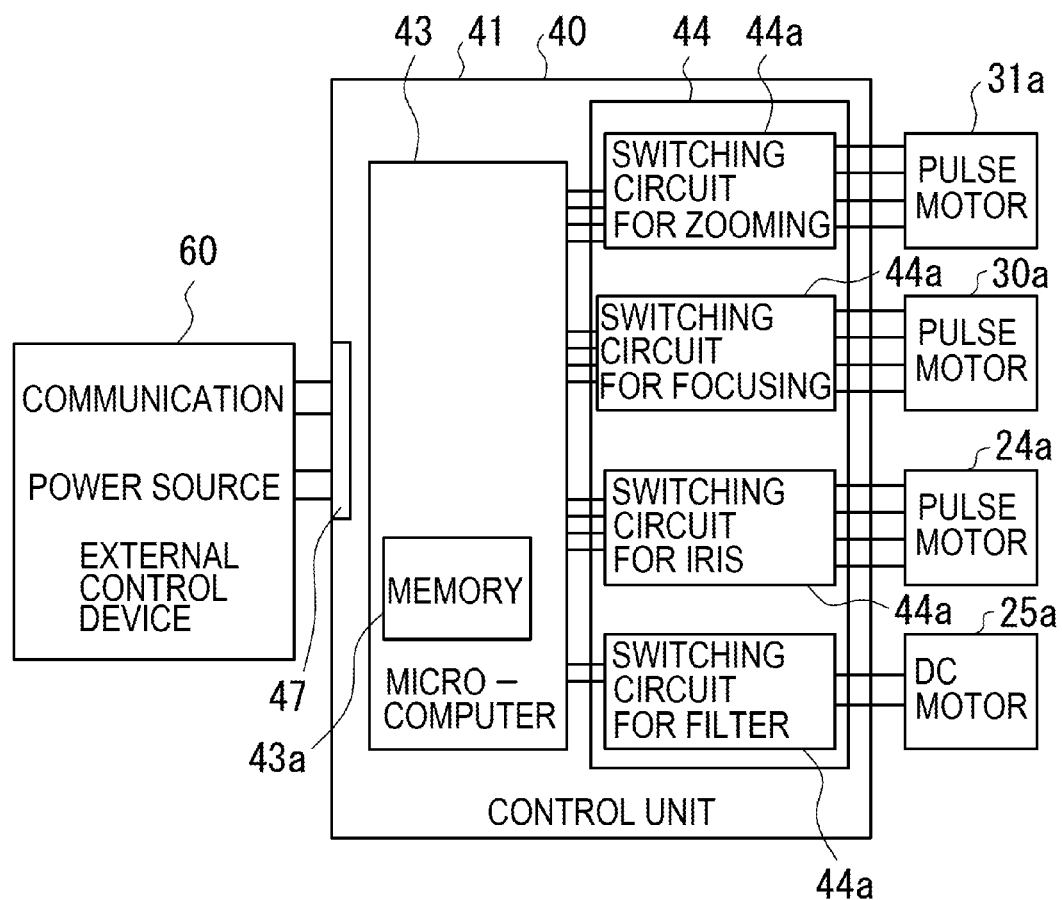
FIG. 5 is a block diagram illustrating a control unit composed of a flexible circuit.

FIG. 1 is a drawing illustrating an appearance of a varifocal lens; FIG. 2 is an exploded perspective view of a varifocal lens body and respective units; FIG. 3 is an exploded perspective view of the varifocal lens body; FIG. 4 is a drawing illustrating an appearance of a flexible circuit provided along an outer edge of the varifocal lens body; and FIG. 5 is a block diagram illustrating a control unit composed of the flexible circuit.

As illustrated in FIG. 1, FIG. 2, and FIG. 4, a varifocal lens 1 as an example of the CCTV lens of the invention includes a control unit 40 composed of a flexible circuit 41, a lens body 2, a focus gear unit 30, a zoom gear unit 31, and an iris unit 23, and is provided with the flexible circuit 41 along an outer edge of the lens body 2.

The lens body 2 includes a focus adjustment section 5 and a zoom adjustment section 15 as illustrated in FIG. 3. First of all, the focus adjustment section 5 of the lens body 2 will be described.

Configuration of Focus Adjustment Section

As illustrated in FIG. 3, the focus adjustment section 5 is configured to adjust focus, and includes a focus lens unit 6 positioned on a photographic subject side and having a focus lens attached on a lens frame, a focus rotation ring 7 configured to generate a drive force for moving the focus lens unit 6, and a focus retaining frame 8 configured to house the focus lens unit 6 and guide the movement of the focus lens unit 6 in a direction of an optical axis.

The focus adjustment section 5 includes the focus rotation ring 7 located at an outermost portion, and the focus retaining frame 8 integrated in the interior of the focus rotation ring 7. In the interior of the focus retaining frame 8, the focus lens unit 6 is integrated. FIG. 3 illustrates the order of coupling of the focus lens unit 6, the focus retaining frame 8, and the focus rotation ring 7 by arrows of broken lines. An arrow A indicates a state of coupling of the focus lens unit 6 with the focus retaining frame 8, and the focus retaining frame 8 having the focus lens unit 6 integrated therein is coupled to the focus rotation ring 7 as indicated by an arrow B.

The focus lens unit 6 has a ring-shaped lens frame for attaching the lens, and a movable pin 6a projected from an outer periphery of the lens frame. Although the focus lens unit 6 includes a plurality of lenses, the focus lens unit 6 may be composed of a single lens instead of the plurality of lenses.

The focus rotation ring 7 has a ring shape, includes a gear portion 7a at the rear of an outer periphery, and a depression 7b on an inner peripheral portion formed in a helical shape. The focus rotation ring 7 serves as a member coupled to the focus gear unit 30 described later for transmitting a drive force for moving the focus lens unit 6.

The focus retaining frame 8 is formed into a cylindrical shape, and is provided with a slit-shaped movable pin guide groove 8a on an outer peripheral surface formed in parallel with an optical axis by notching an inner wall of the cylinder of the focus retaining frame 8. The focus retaining frame 8 is provided with a fitting 8b at the other end thereof for attaching the iris unit 23 illustrated in FIG. 2. Both ends of the movable pin guide groove 8a of the focus retaining frame 8 are configured to engage the movable pin 6a of the focus lens unit 6 and serve as stoppers for the moving movable pin 6a. A defined end of the movable pin guide groove 8a of the focus retaining frame 8 (for example, the end positioned on the fitting 8b side of the focus retaining frame 8) is utilized as a reference position for counting the number of steps of a pulse motor 30a (illustrated in FIG. 2) integrated in the focus gear unit 30. The number of steps is the number of pulse input to an input terminal for normal rotation or reverse rotation of the pulse motor, assuming that the number of steps of the pulse motor at the reference position is "0". For example, the number of steps corresponds to a counted value of a counter when the number of pulses input in the direction of normal rotation of the pulse motor is counted with the counter so as to be increased and the number of pulses input in the direction of reverse rotation of the pulse motor is counted with the counter so as to be reduced.

In the focus adjustment section 5, the movable pin 6a of the focus lens unit 6 is inserted into the movable pin guide groove 8a of the focus retaining frame 8. A distal end portion of the movable pin 6a of the focus lens unit 6 engages the depression 7b provided on the inner peripheral portion of the focus rotation ring 7 rotatably attached to an outer periphery of the focus retaining frame 8. Therefore, when the focus rotation ring 7 rotates, the movable pin 6a of the focus lens unit 6 moves along the depression 7b of the focus rotation ring 7, and the focus lens unit 6 moves in the direction of the optical axis by the movable pin guide groove 8a of the focus retaining frame 8.

Configuration of Zoom Adjustment Section

In contrast, the zoom adjustment section 15 is configured to adjust variations in magnification, and includes a zoom lens unit 16 including a zoom lens mounted on the lens frame, a zoom retaining frame 17 configured to house the zoom lens unit 16 and guiding the movement of the zoom lens unit 16 in the direction of the optical axis, and a zoom rotation ring 18 configured to generate a drive force for moving the zoom lens unit 16.

The zoom adjustment section 15 includes the zoom rotation ring 18 located at an outermost portion, and the zoom retaining frame 17 integrated in the interior of the zoom rotation ring 18. In the interior of the zoom retaining frame 17, the zoom lens unit 16 is integrated. FIG. 3 illustrates the order of coupling of the zoom lens unit 16, the zoom retaining frame 17, and the zoom rotation ring 18 by arrows of broken lines. An arrow C indicates a state in which the zoom lens unit 16 couples with the zoom retaining frame 17, and the zoom retaining frame 17 having the zoom lens unit 16 integrated therein couples with the zoom rotation ring 18 as indicated by an arrow D.

The zoom lens unit 16 has a ring-shaped lens frame for attaching the lens, and a movable pin 16a projected from an outer periphery of the lens frame. Although the zoom lens unit 16 includes a plurality of lenses, the focus lens unit 16 may be composed of a single lens instead of the plurality of lenses.

The zoom retaining frame 17 is formed into a cylindrical shape, and is provided with a slit-shaped movable pin guide groove 17a on the cylinder formed in parallel with an optical axis by notching an inner wall of the cylinder of the zoom retaining frame 17. At an end of the zoom retaining frame 17 on the side that couples with the focus adjustment section 5 includes a fitting 17b for coupling with the focus adjustment section 5. At the other end of the zoom retaining frame 17 is provided with a mount portion 17c for being coupled with the CCTV camera (not illustrated). Both ends of the movable pin guide groove 17a of the zoom retaining frame 17 is configured to serve as stoppers for the movable pin 16a of the zoom lens unit 16. A defined end of the movable pin guide groove 17a of the zoom retaining frame 17 (for example, the end positioned on the mount portion 17c side of the zoom retaining frame 17) is utilized as a reference position for counting the number of steps of a pulse motor 31a (illustrated in FIG. 2) integrated in the zoom gear unit 31.

The zoom rotation ring 18 has a ring shape, includes a gear portion 18a on part of an outer periphery, and a depression 18b on an inner peripheral portion. The zoom rotation ring 18 serves as a member coupled to the zoom gear unit 31 described later for transmitting a drive force for moving the zoom lens unit 16.

In the zoom adjustment section 15, the movable pin 16a of the zoom lens unit 16 is inserted into the movable pin guide groove 17a of the zoom retaining frame 17, and a distal end of the movable pin 16a engages the depression 18b on the inner peripheral portion of the zoom rotation ring 18. Therefore, when the zoom rotation ring 18 rotates, the movable pin 16a of the zoom lens unit 16 moves along the depression 18b of the zoom rotation ring 18, and the zoom lens unit 16 moves in the direction of the optical axis by the movable pin guide groove 17a of the zoom retaining frame 17.

The focus adjustment section 5 and the zoom adjustment section 15 are fixed by fastening a screw into a screw hole (not illustrated) provided in the focus adjustment section 5 and a hole of the fitting 17b.

Action of Focus Gear Unit

The gear portion 7a of the focus rotation ring 7 engages the focus gear unit 30. The focus gear unit 30 illustrated in FIG. 2 includes the pulse motor 30a and the gear integrated therein, and includes a gear train (not illustrated) including the gear attached to a rotating shaft of the pulse motor 30a. The rotation of the pulse motor 30a of the focus gear unit 30 is transmitted to the gear portion 7a of the focus rotation ring 7 of the focus adjustment section 5 via the gear train, and the focus rotation ring 7 rotates.

By the rotation of the focus rotation ring 7, the movable pin 6a of the focus lens unit 6 moves along the depression 7b of the focus rotation ring 7, and the focus lens unit 6 moves in the direction of the optical axis by the movable pin guide groove 8a of the focus retaining frame 8. The direction of movement of the focus lens unit 6 is determined by the direction of rotation of the pulse motor 30a. In the pulse motor 30a, a step angle of the rotating shaft with respect to one pulse is fixed, the angle of rotation of the rotating shaft is determined in accordance with the number of pulses, and the amount of movement of the focus lens unit 6 with respect to the number of pulses of the pulse motor 30a is determined in accordance with a gear ratio of the gear train of the focus gear unit 30 and a gear ratio of the gear portion 7a of the focus rotation ring 7. By employing the number of pulses of the pulse motor 30a as a counted value from the reference position, the position of the focus lens unit 6 is determined by the number of steps of the pulse motor 30a from the reference position.

Action of Zoom Gear Unit

The gear portion 18a of the zoom rotation ring 18 engages the zoom gear unit 31. The zoom gear unit 31 illustrated in FIG. 2 includes the pulse motor 31a and the gear integrated therein, and includes a gear train 32 including the gear attached to the rotating shaft of the pulse motor 31a. The rotation of the motor of the zoom gear unit 31 is transmitted to the gear portion 18a of the zoom rotation ring 18 of the zoom adjustment section 15 via the gear train 32, and the zoom rotation ring 18 illustrated in FIG. 3 rotates. When the zoom rotation ring 18 rotates, the movable pin 16a of the zoom lens unit 16 moves along the depression 18b of the zoom rotation ring 18, and the zoom lens unit 16 moves in the direction of the optical axis by the movable pin guide groove 17a of the zoom retaining frame 17.

The direction of movement of the zoom lens unit 16 is determined by the direction of rotation of the pulse motor 31a. In the pulse motor 31a, a step angle of the rotating shaft with respect to one pulse is fixed, the angle of rotation of the rotating shaft is determined in accordance with the number of pulses, and the amount of movement of the zoom lens unit 16 with respect to the number of pulses of the pulse motor 31a is determined in accordance with a gear ratio of the gear train of the zoom gear unit 31 and a gear ratio of the gear portion 18a of the zoom rotation ring 18. By employing the number of pulses of the pulse motor 31a as a counted value from the reference position, the position of the zoom lens unit 16 is determined by the number of steps of the pulse motor 31a from the reference position.

With the employment of the pulse motor capable of controlling the step angle as the motors of the focus gear unit 30 and the zoom gear unit 31, open-loop control is enabled, and a position detector is not required, so that the portion around the lens may be reduced in size.

Configuration of Iris Unit

The iris unit 23 illustrated in FIG. 2 includes an iris adjustment section 24 configured to adjust the amount of light from the focus lens unit 6 as an objective lens. The iris adjustment section 24 includes a pulse motor 24a and diaphragm blades 24b. The iris adjustment section 24 is configured to adjust the amount of light by controlling the sliding amount of the two diaphragm blades 24b configured to be linearly slidable on the substrate having an opening which defines an optical path by the pulse motor 24a.

The iris unit 23 is provided with an optical filter unit 25 configured to insert an optical filter (ND filter) into the optical path. The optical filter has transmitting properties depending on the wavelength, and an infrared cut filter configured to cut light in an infrared region is employed here. Actions of insertion of the optical filter into the optical path and removal from the optical path are performed by a DC motor 25a as an actuator for driving the optical filter. The optical filter unit 25 inserting the optical filter (ND filter) onto the optical path may not be provided depending on the environment in which the varifocal lens 1 is used.

The iris adjustment section 24 and the optical filter unit 25 are attached to the fitting 8b illustrated in FIG. 3, and hence are interposed between the focus adjustment section 5 and the zoom adjustment section 15 of the lens body 2, and are fixed to the lens body 2.

In this manner, the varifocal lens 1 includes one each of the pulse motor for controlling the focus adjustment section 5, the zoom adjustment section 15 and the iris adjustment section 24, and includes one DC motor 25a for the optical filter unit 25. The control unit 40 illustrated in FIG. 1 and FIG. 4 always stores the numbers of steps from the reference positions of the respective pulse motors in order to control the position of the focus lens unit 6 of the focus adjustment section 5 on the optical axis, the position of the zoom lens unit 16 of the zoom adjustment section 15 on the optical axis, and the position of the diaphragm blades 24b in the iris adjustment section 24. The control unit 40 controls the state of being inserted into or retracted from the optical path of the optical filter of the optical filter unit 25 integrated in the iris unit 23 on the basis of the driving state of the DC motor 25a, and stores the driving state such as the direction of rotation of the DC motor 25a just before on a steady basis.

Configuration of Control Unit of Varifocal Lens

Subsequently, the control unit configured to control the pulse motors of the respective adjustment sections, namely, the focus adjustment section 5, the zoom adjustment section 15, and the iris adjustment section 24, and the DC motor 25a of the optical filter unit 25 will be described with reference to FIG. 4 and FIG. 5. FIG. 4 is a drawing illustrating an appearance of the flexible circuit provided along the outer edge of the lens body 2, and FIG. 5 is a block diagram illustrating the control unit composed of the flexible circuit.

As illustrated in FIG. 4, the control unit 40 includes the flexible circuit 41 provided with IC chips such as a microcomputer 43 and a motor driver circuit 44, and components such as a resistor (not illustrated) and a capacitor (not illustrated) on a flexible substrate 42. The substrate formed of a flexible member such as a film and configured to mount the components is referred to as the flexible substrate 42, and the substrate having the components mounted on the flexible substrate 42 to form a circuit (circuit substrate) is referred to as the flexible circuit 41. The flexible substrate 42 is formed of a polyimide film having a high bending property. Therefore, portions other than areas where the IC chips and the components are provided may be curved or bent so as to be provided on the surface of the lens body 2. For example, by bending portions indicated by broken lines shown on the flexible substrate 42, the control unit 40 may be formed in a state in which part of the flexible substrate 42 is bent by approximately 90 degrees.

As illustrated in FIG. 5, the microcomputer 43 of the control unit 40 includes a CPU, a memory 43a, and an input and output section, and a program for performing communication with the outside, drive control of the motors, and control of the motors is integrated in the memory 43a. A readable/writable non-volatile memory is used for the memory 43a of the microcomputer 43. Accordingly, the data or the like written in the memory 43a is stored even though the power is OFF. The input and output section includes a communication circuit for performing communication with the outside, and an output circuit for an output to the motor driver circuit 44.

Communication between the control unit 40 and an external control device 60 (a unit for controlling the zoom lens from the outside) is performed by serial communication. As illustrated in FIG. 5, the power source supplied from the outside and lines for a receiving signal and a sending signal for the communication circuit are connected to the I/O terminal 47 of the control unit 40. The I/O terminal 47 of the control unit 40 is provided at a longitudinal end of the flexible circuit 41 illustrated in FIG. 4.

A wiring pattern of a voltage to be supplied to the respective pulse motors is formed on the flexible circuit 41 illustrated in FIG. 4, and an input terminal of the pulse motor is connected to a land 48 provided at an end portion of the wiring pattern with solder or the like. An input terminal of the DC motor 25a of the optical filter unit 25 is connected with a land 49 of the wiring pattern for voltage supply with solder. A land 50 for fixing the flexible circuit 41 to the lens body 2 is provided on the flexible circuit 41.

Accordingly, as illustrated in FIG. 5, drive voltages output from switching circuits 44a of the motor driver circuit 44 of the control unit 40 are input to the pulse motors 31a, 30a, 24a and the DC motor 25a. In each of the pulse motors 31a, 30a, 24a, there are two input terminals for each of A-phase and B-phase, and the voltage is supplied from the motor driver circuit 44 to the four input terminals in total. In this manner, the voltage supply to the respective motors is directly performed from the pattern of the flexible circuit 41.

As described above, since the circuit board of the control unit is composed of the flexible circuit and is provided on the lens body, and the drive voltage is applied from the flexible circuit directly to the input terminals of the pulse motors or the like, a connector is not required to be interposed for the voltage supply of the motors, and hence a contact failure caused by the connector can be prevented. In addition, although fourteen motor driving lines in total including twelve lines for the three pulse motors, and two lines for the DC motor, are required in the related art, wiring of motor using the connector is no longer necessary.

Since the communication with respect to the external control device employs a serial communication system, the number of signal lines with the external control device may be reduced.

Since no projection having a height is provided on the flexible circuit except for a surface-mounted electronic component, a reduction in size of the periphery of the lens body is achieved.

Communication Mode Between Control Unit and External Control Device

Subsequently, the communication mode between the control unit 40 and the external control device will be described with reference to FIG. 6 and FIG. 7. FIG. 6A is a drawing illustrating a configuration of byte data in communication with the control unit and the external control device, and FIG. 6B is a drawing illustrating a configuration of a communication packet format. FIG. 7A is a drawing illustrating a communication mode of requesting data on the number of steps from the reference position of the pulse motor as a lens position from the external control device to the control unit. FIG. 7B is a drawing illustrating a communication mode of a response from the control unit.

The control unit 40 and the external control device 60 are set to have the same communication speed in advance, and perform serial communication with byte data. As illustrated in FIG. 6A, the byte data includes a start bit (indicated by START in FIG. 6A), 8 bit command or data from a data bit 0 (indicated by B0 in FIG. 6A) to a data bit 7 (indicated by B7 in FIG. 6A) and a stop bit (illustrated as STOP in FIG. 6A). ASCII code is used for control code, a command, data, and the like. The communication packet format includes an STX (Start of Text) indicating the start of a text portion, a command, a motor number, a data portion, an ETX (End of Text) indicating the end of the text portion, and a BCC (Block Checking Code) which indicates a sum of values from STX to ETX as illustrated in FIG. 6B.

STX is composed of 1 byte, and 02h of ASCII code is allocated. "h" of 02h is a sign indicating that 02 is a hexadecimal number. The command is composed of 1 byte, and ASCII code is allocated to each command. The motor number is composed of 1 byte, and ASCII code is allocated to each motor. For example, a number 31h, which indicates the number 1, is allocated to the pulse motor 31a configured to move the zoom lens unit 16 of the zoom adjustment section 15, and a number 32h, which indicates the number 2, is allocated to the pulse motor 30a configured to move the focus lens unit 6 of the focus adjustment section.

A number 33h, which indicates the number 3, is allocated to the pulse motor 24a configured to control the diaphragm blades 24b of the iris adjustment section 24, and a number 34h, which indicates the number 4, is allocated to the DC motor 25a configured to drive the optical filter unit 25. The data portion has a variable length, and data composed of ASCII code is allocated. ETX is composed of 1 byte, and 03h of ASCII code is allocated. BCC is composed of 1 byte and is a sum of values of data from STX to ETX.

The control unit 40 receives a command from the external control device 60, and if the normal communication is performed, returns ACK (ACKnowledge) or response data. If any communication error occurs in receiving, the control unit 40 outputs NACK (Negative ACKnowledge), and requests retransmission of the command or the like to a source. If the source cannot confirm the response in a predetermined period after the output of the command or the like, the source outputs the command again as no reply.

As an example of the communication mode, data transmission of the number of steps from the reference position of the pulse motor 31a stored in the control unit 40 to the external control device 60 will be described with reference to FIG. 7. The data of the number of steps from the reference position of the pulse motor 31a is handled as data indicating the position of the zoom lens unit 16.

As illustrated in FIG. 7A, the external control device 60 outputs a command (53h) to the control unit 40 together with the motor number (31h). The microcomputer 43 of the control unit 40 reads out the data of the number of steps from the reference position of the pulse motor 31a for the zoom lens unit 16 from the memory 43a in response to the command from the external control device 60, and responses a command (52h), the motor number (31h), and 3 byte data, which is obtained by converting the read-out data into ASCII, to the external control device 60 in a communication format illustrated in FIG. 7B. Accordingly, the external control device 60 is capable of confirming the position of the zoom lens unit 16 by the number of steps from the reference position of the pulse motor 31a of the varifocal lens 1.

In this manner, with the provision of the control unit 40 on the varifocal lens 1, the control of the motors which drives the lenses is centralized and, in addition, by storing information on the lenses in the control unit 40 and reading out the information from the external control device 60, the control from the outside can be facilitated.

The control unit 40 stores an identification number of the varifocal lens 1, and stores operation histories of the respective motors. Therefore, the external control device 60 is capable of reading out the operation histories of the respective motors of the varifocal lens 1 from the control unit 40 and utilizing the read out operation histories as information for maintenance or the like.

In addition, by controlling the varifocal lens 1 by the identification number, for example, by adding the identification number of the varifocal lens 1 to the communication packet format, the varifocal lenses can be controlled individually by the identification numbers. Accordingly, the communication line can be shared with other varifocal lenses 1, and hence simplification of the communication line and a batch control of a plurality of the varifocal lenses are achieved by the external control device 60.

Automatic Focus Adjustment by Zooming (Magnification Change) Operation

Subsequently, an automatic focus adjustment by a zooming (magnification change) operation of the varifocal lens will be described. The varifocal lens 1 needs to adjust magnification of zooming and the focus position individually. In other words, the varifocal lens 1 moves the zoom lens unit 16 in the direction of the optical axis first to adjust the magnification of the zooming, and then moves the focus lens unit 6 to correct misalignment of the focus position (so-called, out-of-focus) caused by the movement of the zoom lens unit 16. In this manner, the varifocal lens 1 corrects the misalignment of a focus position after the adjustment of the magnification of zooming.

Figure 8:
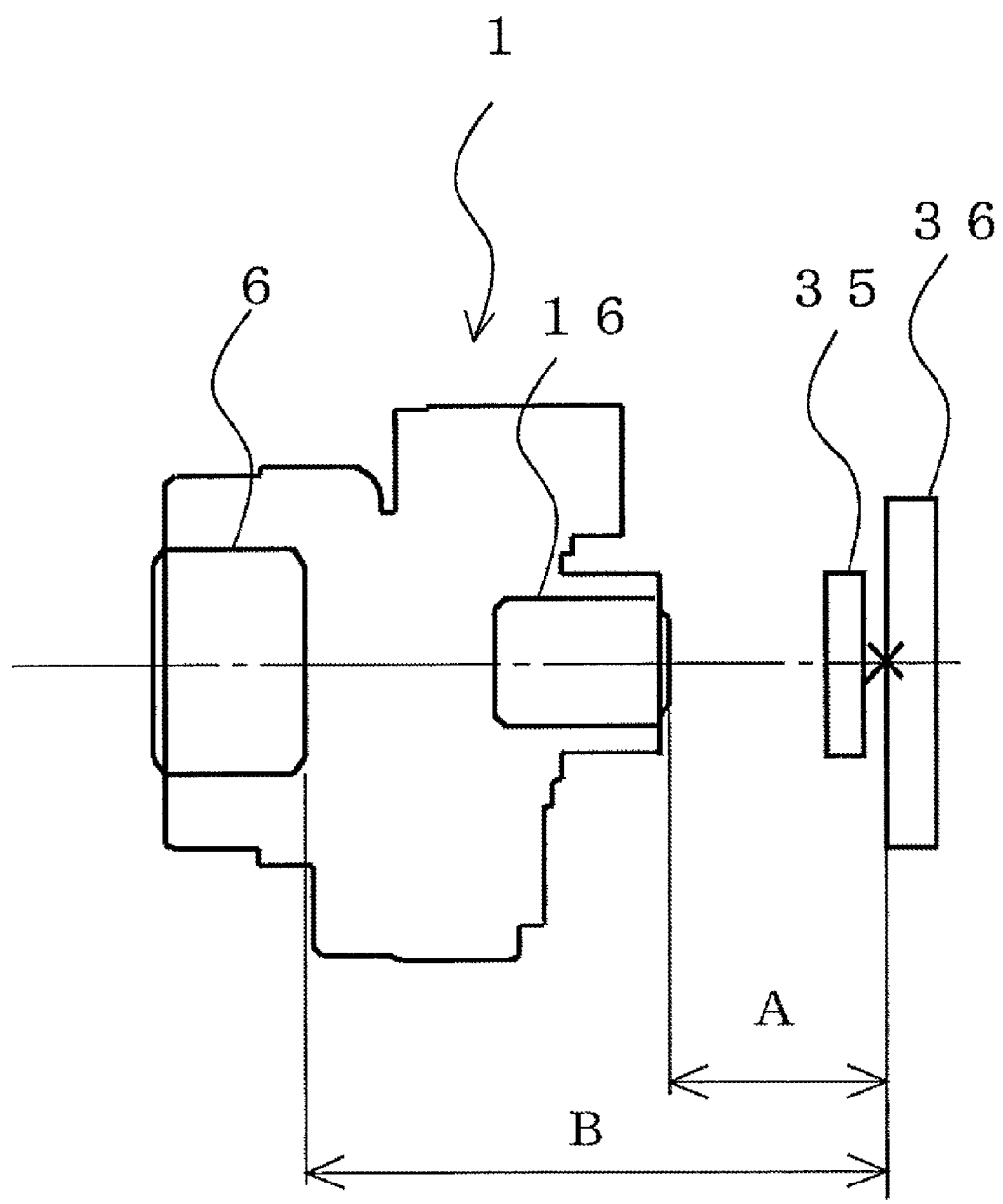
FIG. 8 is a drawing illustrating distances from a zoom lens unit and a focus lens unit of the varifocal lens to an image pickup surface of a CCTV camera.

Subsequently, an automatic focus adjustment by a zooming (magnification change) operation of the CCTV lens in the invention will be described. FIG. 8 is a drawing illustrating distances from a zoom lens unit and a focus lens unit of the varifocal lens to an image pickup surface of the CCTV camera. FIG. 8 illustrates a configuration in which a cover glass 35 having a thickness of 3 mm is arranged on a front surface of an image pickup surface 36 side. In the drawing, A is a distance between the zoom lens unit 16 and the image pickup surface 36 of the CCTV camera, and B is a distance between the focus lens unit 6 and the image pickup surface 36 of the CCTV camera. In FIG. 8, the distance is measured to ends of the respective lens unit on the CCTV camera side.

The position of the zoom lens unit 16 of the varifocal lens 1 as an example of the CCTV lens according to the invention is determined on the basis of the number of steps from the reference position of the pulse motor 31a for the zoom lens unit 16. For example, the respective positions of the zoom lens unit 16 at wide angle, middle, and telephoto (which correspond to the distance A illustrated in FIG. 8) are controlled by the number of steps from the reference position of the pulse motor 31a. For example, the distance A between the zoom lens unit 16 and the image pickup surface 36 of the CCTV camera at wide angle is minimum, and the distance A between the zoom lens unit 16 and the image pickup surface 36 of the CCTV camera at telephoto is maximum.

The positions of the focus lens unit 6 (which correspond to the distance B illustrated in FIG. 8) for adjusting a focal point (focus) at the respective positions of the zoom lens unit 16 are determined by the number of steps from the reference position of the pulse motor 30a for focus adjustment.

The number of steps from the reference position of the pulse motor 31a of the zoom lens unit 16 at wide, middle, and telephoto, and the number of steps from the reference position of the pulse motor 30a of the focus lens unit 6 are stored in the memory 43a of the control unit 40 of the varifocal lens 1. In this manner, the positions of the focus lens unit 6 at the respective positions of the zoom lens unit 16 are stored in advance.

Figure 9:
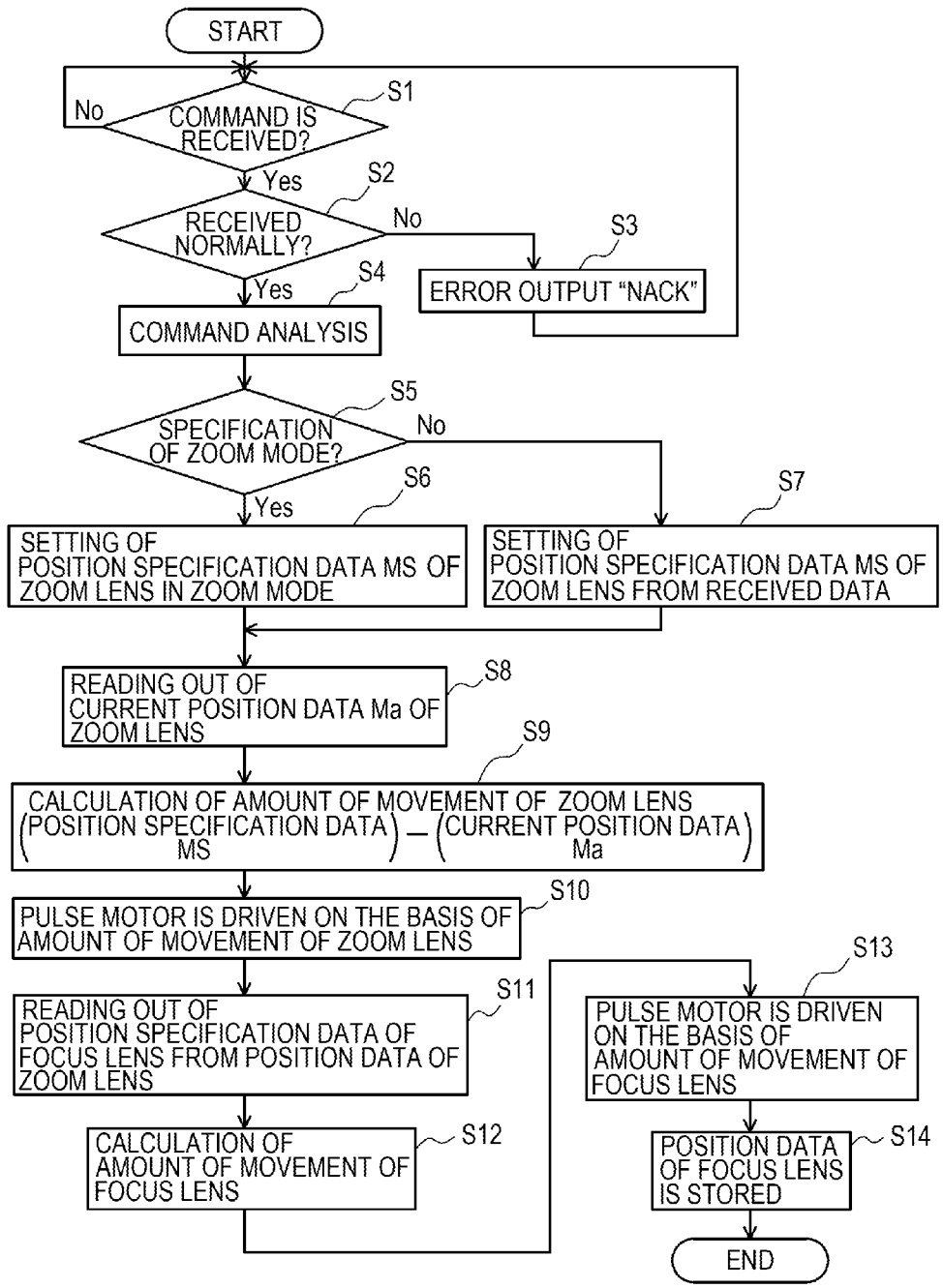
FIG. 9 is a flowchart of motor control that controls "zoom" and "focus" in this order in switching a field of view from wide angle to telephoto, which is a zooming operation by the control unit.

Hereinafter, a zooming operation of the varifocal lens from the outside will be described with reference to FIG. 9. FIG. 9 is a flowchart of motor control that controls "zoom" and "focus" in this order in switching a field of view from wide angle to telephoto, which is the zooming operation by the control unit.

As illustrated in FIG. 9, the control unit 40 inspects whether or not there is a command received from the external control device 60 in a first step, and if there is no command input, waits in a command receivable state (Step S1). When there is a command input (Yes in Step S1), the control unit 40 inspects whether the command is received normally without error (Step S2).

When the communication error occurs in Step S2 (No in Step S2), "NACK" is output to the external control device 60 and the procedure goes to Step S1 after error processing.

When it is determined that the command is normally received in Step S2 (Yes in Step S2), command analysis is performed (Step S4). Whether or not the command from the external control device 60 is a specification of the zoom mode, in other words, a specification of one of wide angle, middle, and telephoto is inspected (Step S5). The specification of the zoom mode corresponds to control of the respective pulse motors performed on the positional data of the zoom lens unit 16 and the focus lens unit 6 at wide, middle, and telephoto stored in the control unit 40 in advance.

In contrast, when the command is a specification of the zoom mode (Yes in Step S5), the positional data of the zoom lens unit 16 corresponding to the zoom mode stored in the memory 43a of the microcomputer 43 in advance is read out and is set as position specification data (hereinafter, the position specification data is indicated by MS). The position specification data MS of the zoom lens unit 16 is specified by the number of steps from the reference position of the pulse motor 31a (Step S6).

In contrast, if the command is not the specification of the zoom mode in Step S5, (No, in Step S5), the number of steps from the reference position of the pulse motor 31a, which is the position specification data of the zoom lens unit 16, is transmitted from the external control device 60, and the received data is set as the position specification data MS of the zoom lens unit 16 (Step S7).

Subsequently, the number of steps from the reference position of the pulse motor 31a is read out from the memory 43a as current position data indicating the current position of the zoom lens unit 16 (hereinafter, the current position data is illustrated as Ma) (Step S8). After the current position data Ma is read out from the memory 43a, the amount of movement of the zoom lens unit 16 is calculated. The calculation of the amount of movement is performed by subtracting the current position data Ma from the position specification data MS. The direction of rotation (the direction of movement of the zoom lens) of the pulse motor 31a and the number of pulses of the pulse motor 31a (the amount of movement of the zoom lens unit 16) are determined by subtraction (Step S9). The pulse motor 31a is driven on the basis of the amount of movement of the calculated zoom lens unit 16 (Step S10). The position specification data MS as the data on destination is stored as the current position data Ma in the memory 43a. Accordingly, the zoom lens unit 16 moves to a specified position.

Subsequently, the focus control is performed after the zoom is adjusted. The focus control is performed by reading out the number of steps from the reference position of the pulse motor 30a as the position specification data of the focus lens unit 6 corresponding to the position MS where the zoom lens unit 16 is moved, which is set in advance from the memory 43a (Step S11). In other words, the control is to set the position data to which the focus lens unit 6 is to be moved for adjusting the focus by the movement of the zoom lens unit 6.

The number of steps from the reference position of the pulse motor 30a, which is the current position data of the focus lens unit 6 is read out from the memory 43a, and the amount of movement of the focus lens unit 6 is calculated. The calculation of the amount of movement is performed by subtracting the current position data from the position specification data. The direction of rotation (the direction of movement of the focus lens) of the pulse motor 30a and the number of pulses of the pulse motor 30a (the amount of movement of the focus lens) are determined by subtraction (Step S12). The pulse motor is driven on the basis of the amount of movement of the calculated focus lens (Step S13). Subsequently, the position specification data, which is data on the destination of the focus lens, is stored as the current position data in the memory 43a (Step S14).

Accordingly, the varifocal lens 1 is adjusted in focus (image formation) automatically even though the zooming (magnification change) operation is performed in the same manner as the zoom lens, handling is facilitated.

The control unit 40 of the varifocal lens 1 is also capable of controlling the pulse motor so as to move the zoom lens unit and the focus lens unit to a predetermined position at the time when the power is ON, for example, to a position corresponding to any one of wide angle, middle, and telephoto.

Process of Lens Peripheral Illumination Correction

Figure 10:
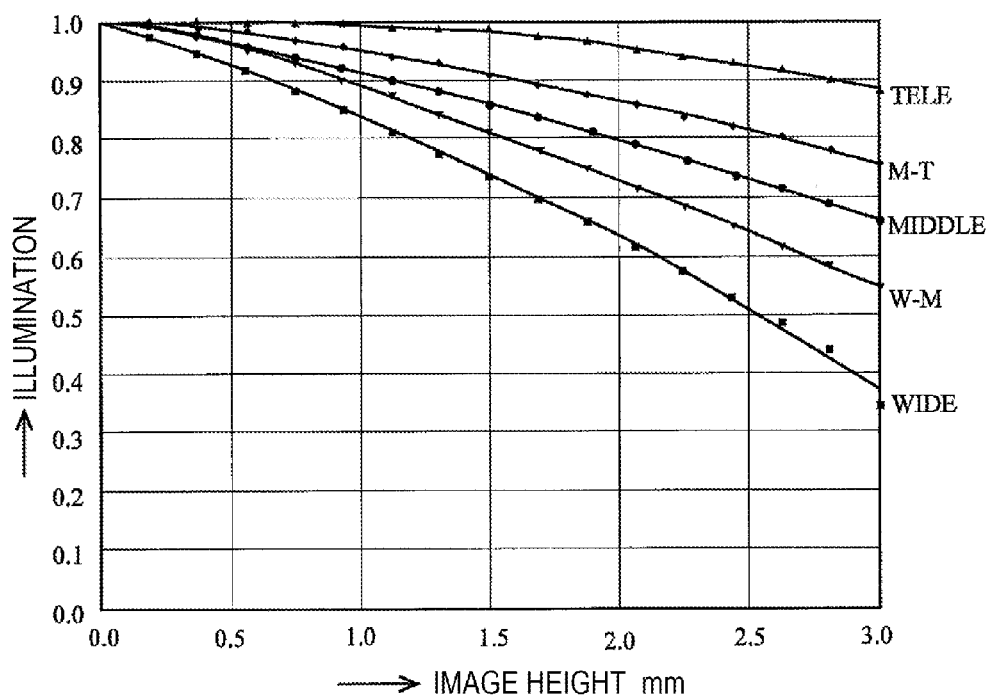
FIG. 10 is a drawing illustrating a change of brightness in the periphery of the lens with respect to an image height.
Figure 11:
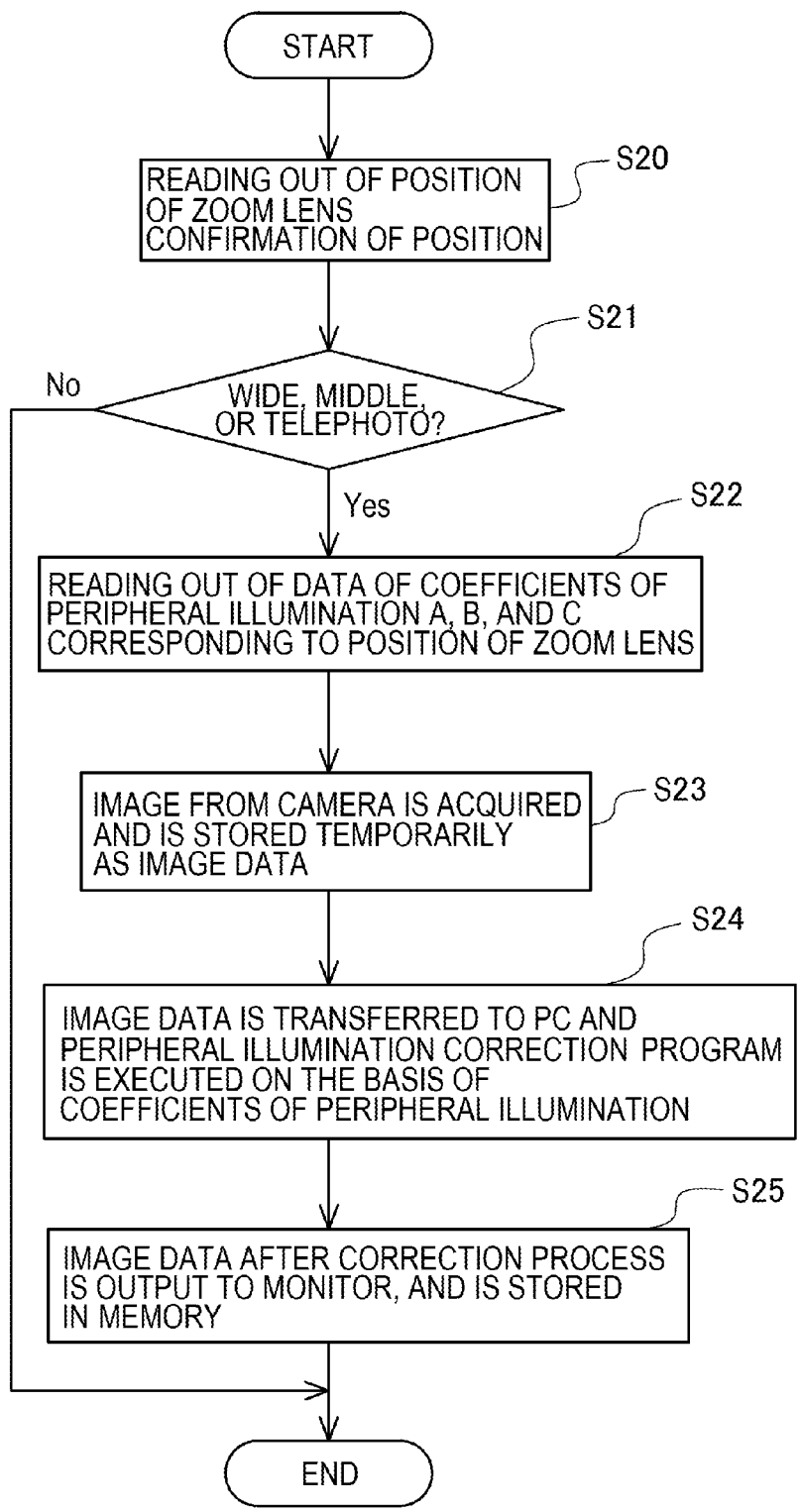
FIG. 11 is a flowchart illustrating a process relating to a lens peripheral illumination correction.

Subsequently, the process to be performed for a lens peripheral illumination correction, a lens distortion aberration correction, and a lens resolution increase correction will be described. First of all, the lens peripheral illumination correction will be described with reference to FIG. 10 and FIG. 11. FIG. 10 is a drawing illustrating a brightness change in the periphery of the lens with respect to an image height, and FIG. 11 is a flowchart of the process relating to the peripheral illumination correction.

The brightness (peripheral illumination) in the periphery of the lens is reduced as the inclination of an incident light with respect to the optical axis increases. The lens peripheral illumination correction is a process for correcting lowering of brightness in the periphery of the lens because the brightness of the image is lowered as it goes toward the periphery of a screen. As illustrated in FIG. 10, the brightness of the periphery of the lens is lowered as the image height is increased. In the lens peripheral illumination correction, a value of the amount of light of the lens with respect to the image height is obtained in advance. The value of the amount of light is obtained for respective focal lengths of the zoom lens, that is, for example, for a wide angle (indicated by WIDE in FIG. 10) focal length of 3.44 mm, a middle (indicated by MIDDLE in FIG. 10) focal length of 5.33 mm, and a telephoto (indicated by TELE in FIG. 10) focal length of 11.56 mm. As illustrated in FIG. 10, values of the amount of light relating to a middle between the wide angle and the middle (indicated by W-M in FIG. 10), and a middle between the middle and the telephoto (indicated by M-T in FIG. 10) may be prepared.

If the amount of light at an image height 0, that is, at the center of the lens is supposed to be 1, the value of the amount of light at a portion other than the center of the lens becomes lower than 1. For example, the value of the amount of light with respect to a certain value of image height is 0.8 means that the brightness is 80% in comparison with the center of the lens and hence the same brightness as the center of the lens is achieved by multiplying the value of the amount of light by 1.25 as a correction.

The peripheral illumination correction is a correction of brightness of an image data output from a camera and stored in an external memory or the like by the image height, the size of an image pickup area of the camera, and a signal from the camera. The correction process is performed by correcting the brightness of the image data at every two-dimensional XY coordinate values on an image-pickup plane corresponding to the image height from the center position of the image pickup surface. Accordingly, an image displayed on a monitor is corrected.

Changes of the value of the amount of light with respect to the image height illustrated in FIG. 10 are shown by Expression 1 composed of polynomial for each zoom mode, and coefficients of peripheral illumination A, B and C of Expression 1 are calculated in advance and stored in the memory 43a of the control unit 40.

$$y=A \times x^2 + B \times x + C \qquad \text{(Expression 1)}$$

where y is the value of the amount of light and x is the image height, and A, B, C are coefficients of peripheral illumination.

For example, in wide angle (WIDE), A=−0.0248, B=−0.1334, and C=0.9979 of Expression 1 are stored in the memory 43a.

The image from the camera is transferred to a computer (PC) having a processing program integrated therein, and the peripheral illumination correction is performed on the PC. The peripheral illumination correction will be described with reference to a flowchart in FIG. 11.

First of all, data of the number of steps from the reference position of the pulse motor 31a for the zoom lens unit 16 is read out and the position of the zoom lens unit 16 is confirmed (Step S20). In other words, whether the zoom lens unit 16 is in wide (WIDE), middle (MIDDLE) or telephoto (TELE) state is confirmed (Step S21), and when none of the wide, middle and telephoto is applied (No in Step S21), the process of peripheral illumination correction is not performed. When the zoom lens unit 16 is in any one of wide, middle and telephoto (Yes in Step S21), the data of the coefficients of peripheral illumination A, B and C corresponding to the position of the zoom lens unit 16 is read out from the control unit 40 (Step S22).

An image from the camera coupled to the varifocal lens 1 is acquired and is stored in the external memory or the like temporarily as image data (Step S23). The image data is transferred to the PC and the peripheral illumination correction program is executed on the basis of the coefficients of peripheral illumination (Step S24). The image data after the correction process is output to the monitor, and is stored in the memory as image data (Step S25). Accordingly, the peripheral illumination correction of the lens is achieved, and the entire image is corrected to a uniform brightness.

Process of Lens Distortion Aberration Correction

Figure 12:
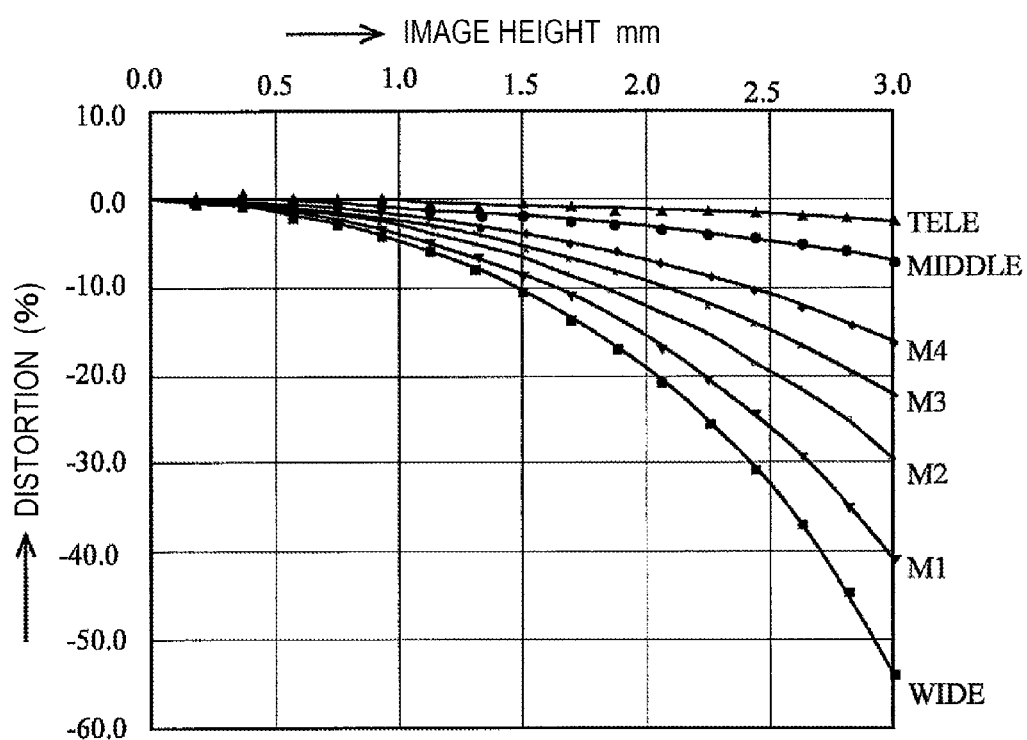
FIG. 12 illustrates an example of distortion aberration D (%) with respect to an ideal image height in wide angle, middle, or telephoto of a varifocal lens.
Figure 13:
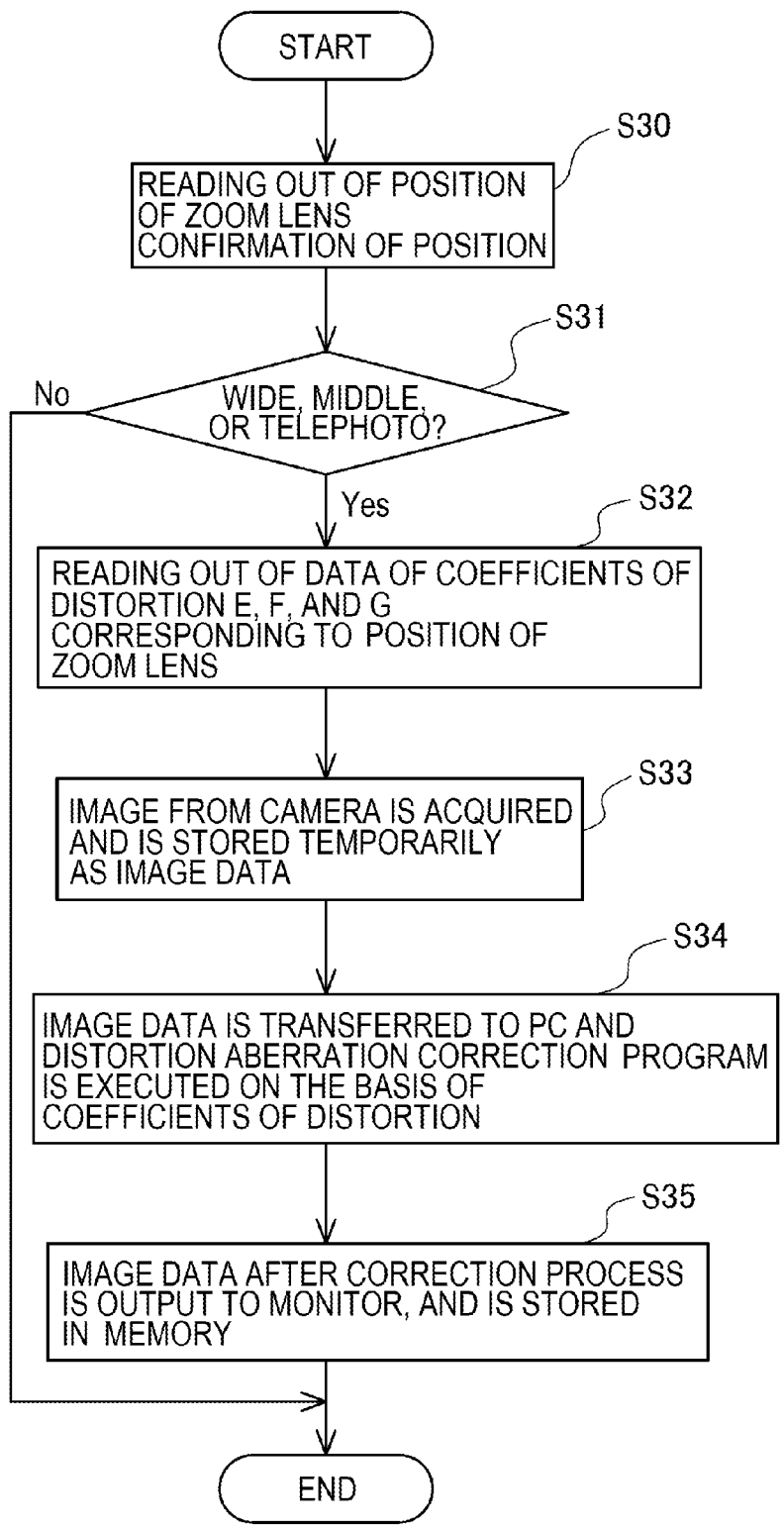
FIG. 13 is a flowchart illustrating a process relating to a distortion aberration correction.

The lens distortion aberration correction is a process for correcting distortion of image caused by the lens. Subsequently, the lens distortion aberration correction will be described with reference to FIG. 12 and FIG. 13. FIG. 12 illustrates an example of distortion aberration D (%) with respect to an ideal image height in wide angle, middle, or telephoto of the varifocal lens 1, and FIG. 13 is a flowchart illustrating a process relating to the distortion aberration correction.

In the lens distortion aberration correction, the distortion aberration of the lens with respect to the image height are obtained in advance for the respective focal lengths of the lens, that is, for wide, middle, and telephoto zoom modes as illustrated in FIG. 12. Distortion aberrations may be prepared in the middle between wide angle (WIDE) and middle (MIDDLE) as illustrated in FIG. 12 (indicated by M1, M2, M3, and M4 from WIDE to MIDDLE in FIG. 12).

The lens has a distortion aberration, which is a distortion impairing mutual similarity between a photographic subject in a plane vertical to the optical axis and an image thereof on an image plane vertical to the optical axis. The lens is subjected to different magnitudes of generated distortion aberration depending on the position of the zoom lens, that is, wide, middle or telephoto. The distortion aberration D of the lens is expressed by percentage of variations in size of the image (variations in image height) at the respective focal lengths in the zoom mode with respect to an ideal image height as shown in Expression 2.

$$\text{distortion aberration } D\ (\%) = (y-y')/y' \times 100(\%) \qquad \text{(Expression 2)}$$

where y is an actual principal light beam image height, and y' is an ideal image height.

As illustrated in FIG. 12, for example, the distortion aberration D with an ideal image height of 2.1 mm at wide angle is −20.7%, the distortion aberration D at middle is −3.1%, and the distortion aberration D at telephoto is −1.1%. The distortions aberration illustrated in FIG. 12 are negative values, and in the case of a square photographic subject, the distortion has a barrel shape. In particular, the distortion aberration D at wide angle is significant and the image is distorted, so that a correction is required.

If the distortion aberration at the image height of 0, that is, at the center of the lens is supposed to be 100%, the value of the distortion aberration at a portion other than the center of the lens becomes lower than 100%. For example, a distortion aberration of −20% with respect to the value having an ideal image height means that the actual image height is distorted by 20% with respect to the ideal image height, that is, is smaller than the ideal image height. Therefore, by multiplying by 1.25 as a correction value for the corresponding position, the distortion at that position is corrected.

The changes in value of the distortion aberration D for the image height illustrated in FIG. 12 are expressed by the respective zoom modes with Expression 3 which is a plural, the coefficients E, F, G, H, and I of Expression 3 are calculated in advance, and stored in the memory 43a of the control unit 40.

$$y = E \times x^4 + F \times x^3 + G \times x^2 + H \times x + I \qquad \text{(Expression 3)}$$

where y is a value of the distortion aberration (D in Expression 2), x is the image height, and E, F, G, H, and I are coefficients.

For example, in middle (MIDDLE), E=−0.0119, F=−0.0686, G=−0.8461, H=0.023, I=−0.0012 are stored in the memory 43a.

The correction process of the lens distortion aberration is performed on image data output from the camera and stored in the external memory or the like by correcting the horizontal and vertical positions at every two-dimensional XY coordinate values on an image pickup surface corresponding to the image height from the center position of the image pickup surface. Accordingly, the image displayed on the monitor is corrected. The image from the camera is transferred to the computer (PC) having a processing program integrated therein, and the lens distortion aberration correction is performed on the PC.

Subsequently, the distortion aberration correction will be described with reference to FIG. 13. FIG. 13 is a flowchart illustrating a process relating to the distortion aberration correction. First of all, data of the number of steps from the reference position of the pulse motor 31a for the zoom lens unit 16 is read out and the position of the zoom lens unit 16 is confirmed (Step S30). In other words, whether zoom lens unit 16 is in wide (WIDE), middle (MIDDLE) or telephoto (TELE) state is confirmed (Step S31), and when none of the wide, middle and telephoto is applied (No in Step S31), the process of distortion aberration correction is not performed. When the zoom lens unit 16 is in any one of wide, middle and telephoto (Yes in Step S31), the data of the coefficients E, F, G, H, and I corresponding to the position of the zoom lens unit 16 is read out from the control unit 40 (Step S32).

The image from the camera coupled to the varifocal lens 1 is acquired and is stored in the external memory or the like temporarily as the image data (Step S33). The image data is transferred to the PC and the distortion aberration correction program is executed on the basis of data on the coefficients E, F, G, H, and I (Step S34). The image data after the correction process is output to the monitor, and is stored in the memory (Step S35). Accordingly, the lens distortion aberration correction is achieved, and the entire image is corrected to an image with no distortion.

Process of Resolution Increase Correction

Figure 14:
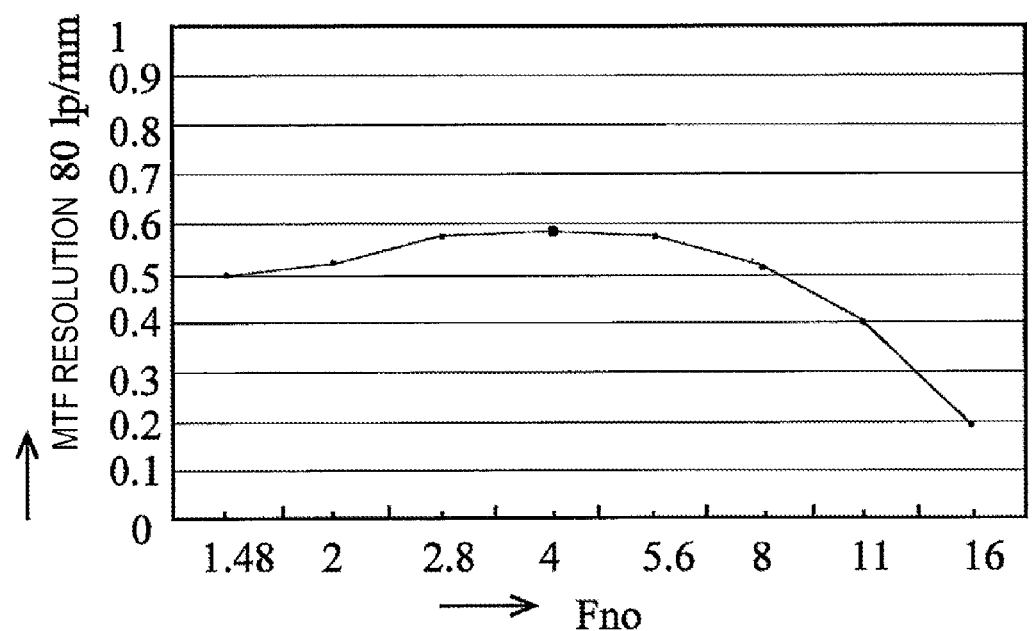
FIG. 14 is a drawing illustrating an example of a relationship between Fno and MTF resolution in wide angle of the varifocal lens.
Figure 15:
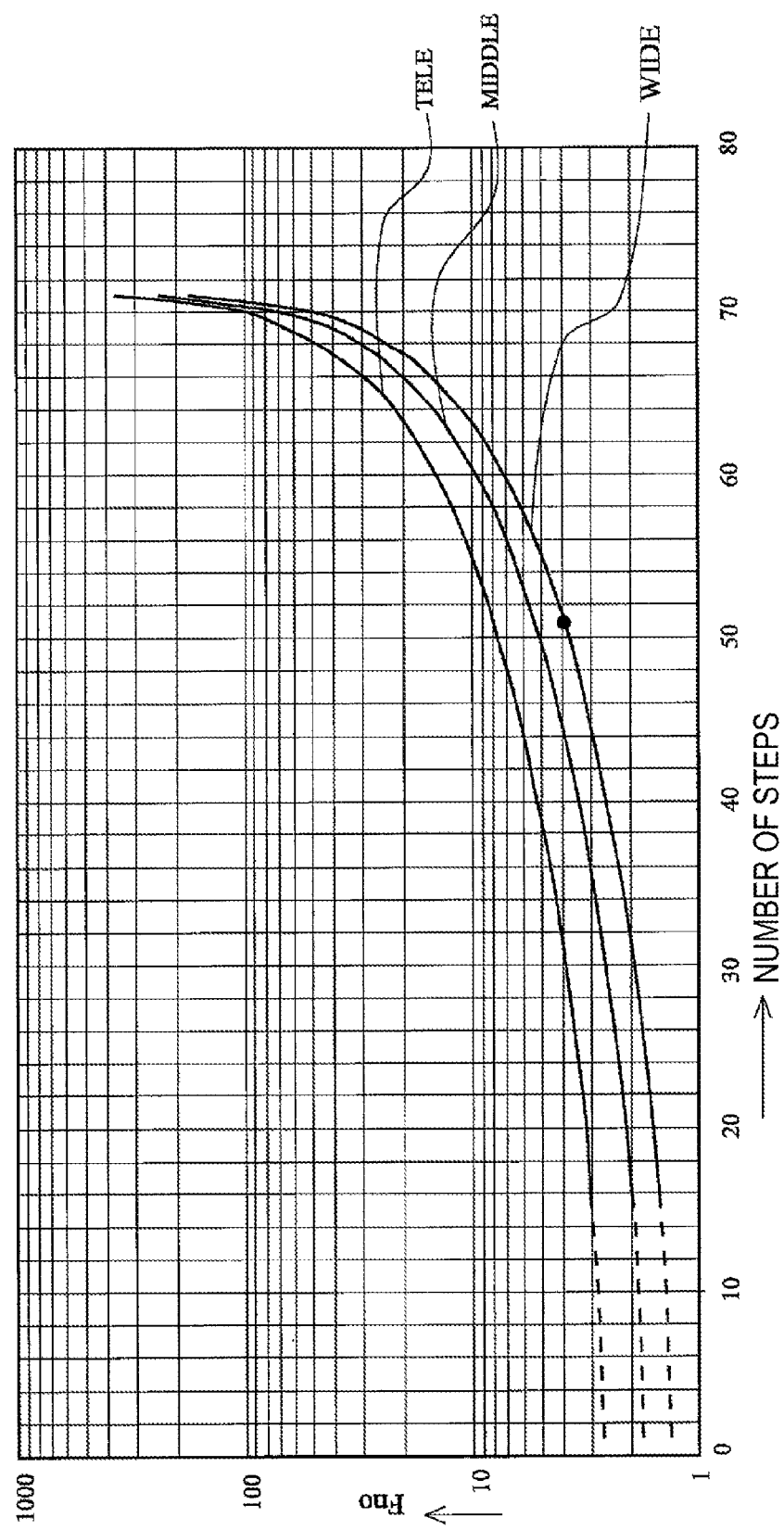
FIG. 15 is a drawing illustrating a change of the Fno with respect to the number of steps from a reference position of a pulse motor of an iris adjustment section of the varifocal lens.
Figure 16:
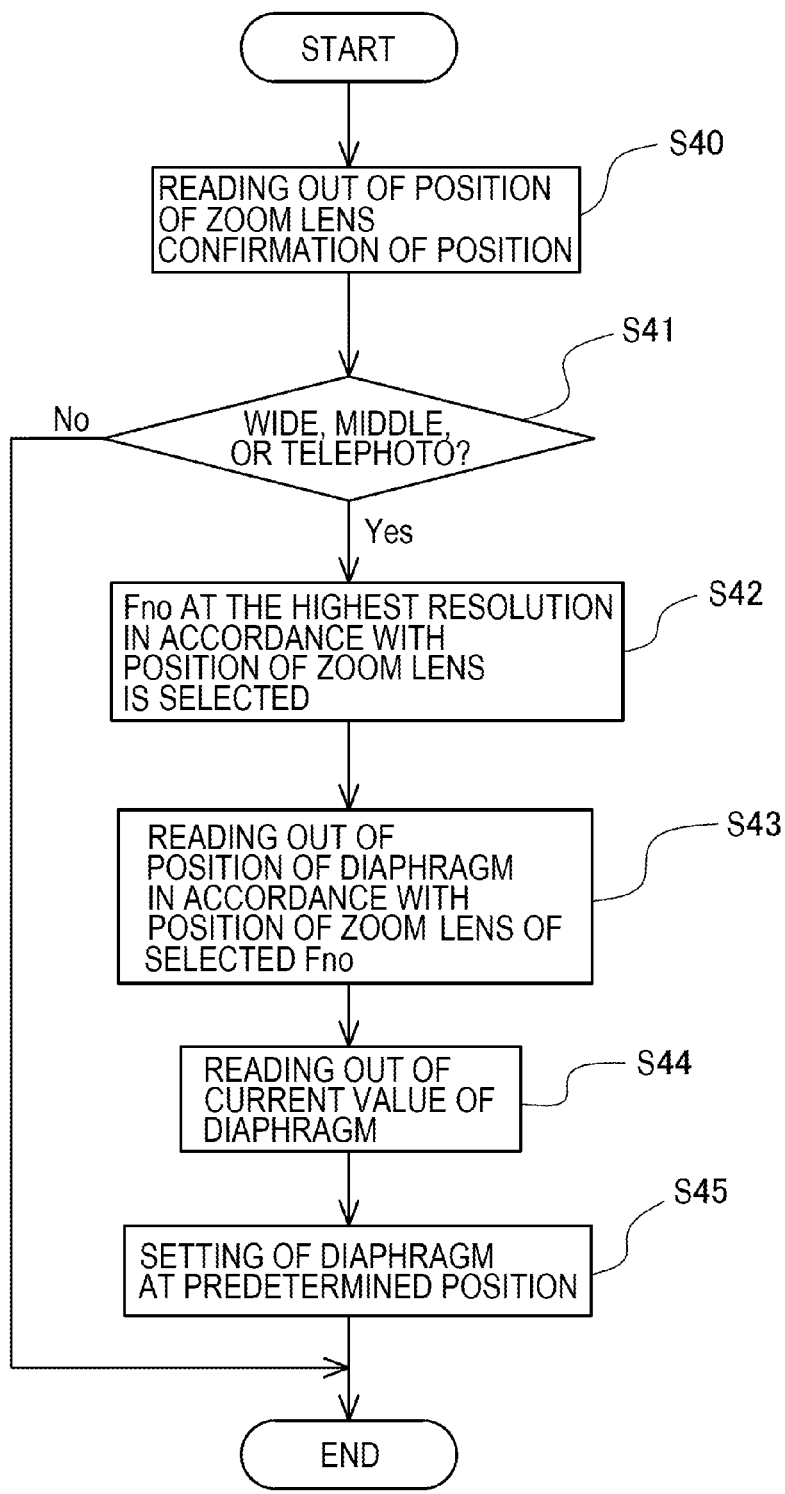
FIG. 16 is a flowchart illustrating a process relating to a resolution increase correction.

Subsequently, the resolution increase correction will be described with reference to FIG. 14 through FIG. 16. FIG. 14 is a drawing illustrating an example of a relationship between Fno and MTF resolution in wide angle of the varifocal lens 1. FIG. 15 is a drawing illustrating a change of the Fno with respect to the number of steps from the reference position of the pulse motor of the iris adjustment section of the varifocal lens 1. FIG. 16 is a flowchart illustrating a process relating to a resolution increase correction.

The varifocal lens 1 has different MTF (Modulation Transfer Function; contrast transmitting function) resolutions of the lens for an F number (indicated by Fno in the drawing) for wide angle, middle, or telephoto, that is, depending on the focal length. The F number (Fno) is expressed by a ratio between the focal length and the diameter of an effective optical flux incident on the lens, and indicates the brightness of the lens. Optimization of the MTF resolution of the lens adjusts the position of an aperture stop of the iris adjustment section 24, so that the MTF resolution becomes the highest resolution at the focal length of the zoom lens at wide angle, middle, or telephoto. The aperture stop of the iris adjustment section 24 is controlled by the pulse motor 24a, and Fno with respect to the number of steps from the reference position of the pulse motor 24a is defined.

Accordingly, the Fno indicating the highest MTF resolution at the respective positions of the zoom lens is determined, and the number of steps from the reference position of the pulse motor 24a for adjusting the position of the aperture stop of the iris adjustment section 24 which sets the Fno is determined.

FIG. 14 is a drawing illustrating an example of a relationship between Fno and MTF resolution in wide angle of the varifocal lens 1. As illustrated in FIG. 14, an MTF highest resolution (the position indicated by a circle in FIG. 14) in wide angle of the varifocal lens 1 is when Fno is 4. In the same manner, Fno at the MTF highest resolution at middle and telephoto is determined and Fno is stored in the control unit 40 for the respective zoom modes of wide, middle, and telephoto.

FIG. 15 is a drawing illustrating a change of the Fno with respect to the number of steps from the reference position of the pulse motor 24a of the varifocal lens 1. The pulse motor 24a of the iris adjustment section 24 is driven so that Fno becomes 4 (the position indicated by a circle in FIG. 15) on the basis of wide (indicated by WIDE in FIG. 15) set in advance and the number of steps from the reference position of the pulse motor 24a. The number of steps from the reference position of the pulse motor 24a at this time is 51. The control unit 40 stores the number of steps from the reference position of the pulse motor of the iris adjustment section with respect to Fno for the respective zoom modes.

The resolution increase correction will be described with reference to FIG. 16 below. FIG. 16 is a flowchart illustrating a process relating to the resolution increase correction.

First of all, data of the number of steps from the reference position of the pulse motor 24a for the zoom lens is read out and the position of the zoom lens unit 16 is confirmed (Step S40). In other words, whether zoom lens unit 16 is in a wide (WIDE), middle (MIDDLE) or telephoto (TELE) state is confirmed (Step S41), and when none of the wide, middle and telephoto is applied (No in Step S41), the process of the resolution increase is not performed. When the zoom lens unit 16 is in any one of wide, middle and telephoto (Yes in Step S41), Fno at the highest resolution in accordance with the position of the zoom lens unit 16 is selected (Step S42).

Subsequently, the position data of the diaphragm blades 24b, which is the number of steps from the reference position of the pulse motor 24a, for the position of the zoom lens corresponding to the selected Fno is read out (Step S43). Data on a current value of the pulse motor 24a indicating the current positions of the diaphragm blades 24b is read out (Step S44), the pulse motor 24a of the iris adjustment section is driven to set the diaphragm blades 24b at predetermined aperture stop positions (Step S45). Accordingly, the MTF resolution becomes maximum in accordance with the position of the zoom lens, and the resolution increase is achieved, whereby a further clear image can be obtained.

In this manner, the CCTV lens of the invention provides a clear image with small distortion by executing the lens peripheral illumination correction, the lens distortion aberration correction, and the lens resolution increase correction.

Other Embodiments

The flexible circuit 41 having a high bending property has been described in the invention. However, the control unit 40 may have a configuration having, instead of the flexible substrate 42, a substrate (not illustrated) formed of a hard material having low refractive index can be molded in a shape that comes into tight contact with the periphery of the lens body 2, and IC chips such as the microcomputer 43 and the motor driver circuit 44, and components such as the resistor (not illustrated), and the capacitor (not illustrated) are provided on the substrate, and being mounted in the periphery of the lens body 2.

As described thus far, the CCTV lens of the invention can be reduced in size in comparison with that of the related art, and easy control is allowed from the outside thereby being usable as a network camera.

The CCTV lens of the invention can be used as a lens for a vehicle mounted camera. For example, by mounting the camera on the front of the vehicle and switching the angle of view depending on the vehicle speed, adequate images in accordance with the circumstance may be obtained. Also, by providing the camera on the rear of the vehicle and selecting an adequate field of view from a plurality of fields of view set in advance at a high speed, support of drivers is achieved.

As described above, since the control unit composed of the flexible circuit including the microcomputer having a communication function and the motor drive circuit is provided on the CCTV lens, the CCTV lens can be controlled easily by inputting the command to the flexible circuit from the power source and the outside via communication.

Also, direct wiring from the flexible circuit to the respective motors for driving the lenses is possible, whereby the number of lines can be restrained, and the motor wiring is simplified.

Since the communication with respect to the external control device employs a serial communication system, the number of signal lines with the external control device can be reduced.

In addition, since the position of the lens can be controlled by the microcomputer, setting of an angle of view such as wide angle, middle, and telephoto is achieved easily by varying a focal length to vary a magnification, so that desired images can be obtained by the microcomputer.

In the related art, positional detection of the motor is achieved from values of resistance of a potentiometer. Since these values are analogue values, calculation for the positional detection is achieved by converting these analogue values to digital values. According to the invention, with the employment of the pulse motor as the motor, open-loop control is enabled, and a position detector is not required, so that the portion around the lens body can be reduced in size.

The invention can be embodied in a number of forms without departing from the essential properties thereof. Therefore, the embodiments described above are given exclusively for description, but do not limit the invention.

What is claimed is:

1. A CCTV lens for a CCTV camera, the CCTV lens comprising:
   a lens body, the lens body including:
      a zoom adjustment assembly including a zoom lens, a zoom retaining frame, and a zoom rotation ring, the zoom adjustment assembly coupling the zoom rotation ring and a zoom gear unit together, and the zoom adjustment assembly varying a magnification of the lens body by moving the zoom lens along an optical axis by a drive force from a first pulse motor integrated in the zoom gear unit; and
      a focus adjustment assembly including a ring-shaped focus rotation ring, a focus lens unit and a focus retaining frame, the focus adjustment assembly coupling the focus rotation ring and a focus gear unit together, and the focus adjustment assembly adjusting a focus of the lens body by moving the focus lens unit along the optical axis by a drive force from a second pulse motor integrated in the focus gear unit;
   an iris adjuster that is fixedly interposed between the zoom adjustment assembly and the focus adjustment assembly of the lens body, the iris adjuster varying an amount of light passing through the lens body by adjusting an opening amount of a linearly slidable diaphragm by drive-controlling a third pulse motor; and
   a control unit, the control unit including:
      an elongated flexible substrate;
      an input/output terminal that is provided at a first longitudinal end of the elongated flexible substrate, the input/output terminal receiving external power and receiving and sending communication signals;
      a microcomputer, including a processor and a memory, that is provided on the elongated flexible substrate; and
      a motor driver circuit that is provided on the elongated flexible substrate and that provides a drive voltage to each of the first, second, and third use motors;
   wherein the elongated flexible substrate of the control unit is bent are bent at areas other than where the microcomputer and the motor driver circuit are provided, and the control unit is mounted on a periphery of an outer edge of the lens body.

2. The CCTV lens for the CCTV camera according to claim 1, wherein the CCTV lens is a varifocal lens.

3. The CCTV lens for a CCTV camera according to claim 2,
   wherein the microcomputer and the motor drive circuit are configured to control the focus of the lens body, and the focus is adjusted by driving the second pulse motor after the magnification is adjusted by driving the first pulse motor.

4. The CCTV lens for a CCTV camera according to claim 2,
   wherein the controller assembly has first, second, and third lands on the elongated flexible substrate, the first, second, and third lands are longitudinally spaced apart from each other, and the first, second, and third lands are electrically connected to the first, second, and third pulse motors, respectively.

5. The CCTV lens for the CCTV camera according to claim 1, wherein
   the memory of the microcomputer stores coefficient data of a polynomial indicating a relationship for correcting brightness of image data from the CCTV lens for the CCTV camera in a periphery of the zoom lens with respect to an image height for every number of steps of the first pulse motor of the zoom adjustment assembly from a reference position,
   the coefficient data of the polynomial corresponding to image data from the CCTV lens for the CCTV camera and indicating a relationship of the brightness in the periphery of the zoom lens with respect to the image height in accordance with the number of steps from the reference position of the first pulse motor of the zoom adjustment assembly is read from the memory, and
   the brightness of the image data from the CCTV lens for the CCTV camera based on the acquired coefficient data of the polynomial is corrected.

6. The CCTV lens for a CCTV camera according to claim 5,
   wherein the microcomputer and the motor drive circuit are configured to control the focus of the lens body, and the focus is adjusted by driving the second pulse motor after the magnification is adjusted by driving the first pulse motor.

7. The CCTV lens for a CCTV camera according to claim 5,
   wherein the controller assembly has first, second, and third lands on the elongated flexible substrate, the first, second, and third lands are longitudinally spaced apart from each other, and the first, second, and third lands are electrically connected to the first, second, and third pulse motors, respectively.

8. The CCTV lens for the CCTV camera according to claim 1, wherein
   the memory of the microcomputer stores coefficient data of a polynomial indicating a relationship of a distortion aberration of image data from the CCTV lens for the CCTV camera of the zoom lens with respect to an image height for every number of steps of the first pulse motor of the zoom adjustment assembly from as reference position,
   the coefficient data of the polynomial corresponding to an image data from the CCTV lens for the CCTV camera and indicating a relationship of the distortion aberration of the zoom lens with respect to the image height in accordance with the number of steps from the reference position of the first pulse motor of the zoom adjustment assembly is read from the memory, and the distortion aberration of the image data from the CCTV lens for the CCTV camera based on the acquired coefficient data of the polynomial is corrected.

9. The CCTV lens for a CCTV camera according to claim 8,
wherein the microcomputer and the motor drive circuit are configured to control the focus of the lens body, and
the focus is adjusted by driving the second pulse motor after the magnification is adjusted by driving the first pulse motor.

10. The CCTV lens for a CCTV camera according to claim 8,
wherein the controller assembly has first, second, and third lands on the elongated flexible substrate, the first, second, and third lands are longitudinally spaced apart from each other, and the first, second, and third lands are electrically connected to the first, second, and third pulse motors, respectively.

11. The CCTV lens for the CCTV camera according to claim 1, wherein
the memory of the microcomputer stores resolution data of the zoom lens with respect to an F number of the lens in accordance with the number of steps of the first pulse motor of the zoom adjustment assembly from a first reference position and F number data corresponding to the number of steps of the third pulse motor of the iris adjuster from a second reference position,
the F number data at a highest resolution with respect to the number of steps of the first pulse motor of the zoom adjustment assembly from the first reference position is selected,
aperture stop position data corresponding to the F number data at the selected highest resolution is read, and
the third pulse motor of the iris adjuster is driven so as to set an aperture stop to a desired position.

12. The CCTV lens for a CCTV camera according to claim 11,
wherein the microcomputer and the motor drive circuit are configured to control the focus of the lens body, and
the focus is adjusted by driving the second pulse motor after the magnification is adjusted by driving the first pulse motor.

13. The CCTV lens for a CCTV camera according to claim 11,
wherein the controller assembly has first, second, and third lands on the elongated flexible substrate, the first, second, and third lands are longitudinally spaced apart from each other, and the first, second, and third lands are electrically connected to the first, second, and third pulse motors, respectively.

14. The CCTV lens for a CCTV camera according to claim 1,
wherein the microcomputer and the motor drive circuit are configured to control the focus of the lens body, and
the focus is adjusted by driving the second pulse motor after the magnification is adjusted by driving the first pulse motor.

15. The CCTV lens for a CCTV camera according to claim 1,
wherein the controller assembly has first, second, and third lands on the elongated flexible substrate, the first, second, and third lands are longitudinally spaced apart from each other, and the first, second, and third lands are electrically connected to the first, second, and third pulse motors, respectively.

* * * * *